United States Patent
Brown et al.

(10) Patent No.: US 10,026,052 B2
(45) Date of Patent: Jul. 17, 2018

(54) ELECTRONIC TASK ASSESSMENT PLATFORM

(71) Applicant: Metrics Medicus, Inc., Olrando, FL (US)

(72) Inventors: Eric A. Brown, Columbia, SC (US); Pamela Andreatta, Jacksonville, FL (US)

(73) Assignee: Metrics Medius, Inc., Orlando, FL (US)

( * ) Notice: Subject to any disclaimer, the term of this patent is extended or adjusted under 35 U.S.C. 154(b) by 0 days.

(21) Appl. No.: 15/722,358

(22) Filed: Oct. 2, 2017

(65) Prior Publication Data

US 2018/0096279 A1 Apr. 5, 2018

Related U.S. Application Data

(60) Provisional application No. 62/403,358, filed on Oct. 3, 2016.

(51) Int. Cl.
*G06Q 10/00* (2012.01)
*G06Q 10/06* (2012.01)
*G06Q 10/10* (2012.01)

(52) U.S. Cl.
CPC ....... *G06Q 10/06398* (2013.01); *G06Q 10/10* (2013.01); *G06Q 10/06311* (2013.01)

(58) Field of Classification Search
CPC ............ G06Q 10/00–50/00; G06F 1/00–21/00
See application file for complete search history.

(56) References Cited

U.S. PATENT DOCUMENTS

| | | | |
|---|---|---|---|
| 6,546,230 B1 * | 4/2003 | Allison | G09B 7/00 434/262 |
| 6,991,464 B2 * | 1/2006 | Liebert | G06Q 50/24 434/236 |
| 7,203,655 B2 * | 4/2007 | Herbert | G06Q 10/06398 705/7.42 |
| 7,720,706 B2 * | 5/2010 | Herbert | G06Q 10/10 705/7.42 |

(Continued)

OTHER PUBLICATIONS

Fischer,Sandra, et al. "Handheld computing in medicine." Journal of the American Medical Informatics Association 10.2 (2003): 139-149. (Year: 2003).*

(Continued)

*Primary Examiner* — Alan S Miller
(74) *Attorney, Agent, or Firm* — DLA Piper LLP (US)

(57) ABSTRACT

Systems and methods for providing an electronic task assessment platform are disclosed. The system may include a first computing device, a second computing device and a server communicatively coupled by a network. A first computing device may include a web browser configured with an assessment builder that enables the creation of customizable assessments. A second computing device may include an assessment application for completion of the customized assessment related to task performance evaluations. The completed assessment may be provided to the server that performs objective evaluation of the completed assessment and generates a specialized report including statistical metrics relating to the task performance evaluations. The report is provided to the first computing device and/or the second computing device.

26 Claims, 38 Drawing Sheets

(56) References Cited

U.S. PATENT DOCUMENTS

| | | | |
|---|---|---|---|
| 7,878,811 B2* | 2/2011 | Earle | G09B 23/28 434/219 |
| 8,190,468 B1* | 5/2012 | Drew | G06Q 10/06 705/7.42 |
| 8,694,441 B1* | 4/2014 | Rothschild | G06Q 10/06398 705/2 |
| 9,842,511 B2* | 12/2017 | Smyth | G09B 19/00 |
| 2002/0035506 A1* | 3/2002 | Loya | G06Q 10/06 705/14.19 |
| 2003/0061070 A1* | 3/2003 | Kelly | G06F 19/324 705/2 |
| 2004/0088177 A1* | 5/2004 | Travis | G06Q 10/06398 705/7.42 |
| 2004/0138903 A1* | 7/2004 | Zuniga | G06Q 10/06398 705/321 |
| 2004/0143489 A1* | 7/2004 | Garman | G06Q 10/06398 705/7.42 |
| 2006/0020503 A1* | 1/2006 | Harris | G06Q 10/06398 705/7.42 |
| 2006/0161456 A1* | 7/2006 | Baker | G16H 40/20 705/2 |
| 2006/0173731 A1* | 8/2006 | Scarpelli | G06Q 10/06398 705/7.19 |
| 2006/0203991 A1* | 9/2006 | Kramer | H04M 3/5175 379/265.06 |
| 2007/0224296 A1* | 9/2007 | Hsiao | A61K 36/28 424/725 |
| 2008/0059292 A1 | 3/2008 | Myers et al. | |
| 2008/0133290 A1* | 6/2008 | Siegrist | G06Q 10/00 705/2 |
| 2009/0089154 A1* | 4/2009 | Dion | G06Q 10/00 705/7.42 |
| 2009/0216558 A1* | 8/2009 | Reisman | G06F 19/328 705/3 |
| 2009/0254401 A1* | 10/2009 | Blanchard | G06Q 10/00 705/7.27 |
| 2009/0259488 A1 | 10/2009 | Gounares et al. | |
| 2013/0224698 A1* | 8/2013 | Gillam | G06Q 10/00 434/219 |
| 2014/0141398 A1* | 5/2014 | Zamierowski | G09B 23/28 434/267 |
| 2016/0071061 A1* | 3/2016 | Biddle | G06Q 10/1053 705/321 |
| 2016/0203432 A1 | 7/2016 | Shaw et al. | |

OTHER PUBLICATIONS

McLean, Michelle, Victoria Brazil, and Patricia Johnson. "How we "breathed life" into problem-based learning cases using a mobile application." Medical teacher 36.10 (2014): 849-852. (Year: 2014).*

The International Search Report and the Written Opinion of the International Searching Authority dated Dec. 11, 2017 for corresponding International Application No. PCT/US2017/054772.

* cited by examiner

FIG. 5C

| Care Assess    Messaging | | | |
|---|---|---|---|
| metrics ⚕ medicus | | ⊗ | Demo User #1 |
| Care Assess | Assessments | | |
| Assessments | | | 1-21 of 21 |
| Library | Assessment | Assessment Date | Status |
| Assessment Library | ☐ US Guided Central Line Placement (IJ) - Summative | 07/12/2016 | Complete |
| Trainee Library | ☐ US Guided Central Line Placement (IJ) - Summative | 07/11/2016 | Complete |
| Author Library | ☐ Code Team Leadership- SVT | 07/11/2016 | Draft |
| Configuration | ☐ Rapid Sequence Intubation - Summative | 07/11/2016 | Complete |
| Assessment Types | ☐ US Guided Central Line Placement (IJ) - Summative | 07/10/2016 | Complete |
| Clinical Specialties | ☐ Rapid Sequence Intubation - Summative | 07/10/2016 | Complete |
| Clinical Performers | ☐ Rapid Sequence Intubation - Summative | 02/20/2016 | Complete |
| Applicable To | ☐ Team Performance Evaluation | 02/17/2016 | Complete |
| Scale Types | ☐ Team Performance Evaluation | 02/17/2016 | Complete |
| Scale Values | ☐ Rapid Sequence Intubation - Summative | 02/16/2016 | Complete |
| Scales | ☐ Code Team Leadership | 02/16/2016 | Complete |
| | ☐ Code Team Leadership | | |

FIG. 6

| Care Assess | Messaging | | | | | | Demo User #1 ▾ |
|---|---|---|---|---|---|---|---| metrics medicus

Care Assess

Assessments /
Rapid Sequence Intubation - Summative

| Assessments | | 703 — | 705 | 707 | | 3 / 21 ◁ ◇ |
|---|---|---|---|---|---|---|

Library

| | Print ▾ | Attachment(s) ▾ | More ▾ | | |
|---|---|---|---|---|---|

Assessment Library

| Resend Assessment Report | Cancel Assessment | Test Progression Data | Test Cohort Data |
|---|---|---|---|

Trainee Library

| | | Draft | Cancelled | Complete | Archived |

Author Library

709 — 701

Configuration

Assessment      Rapid Sequence Intubation - Summative

Assessment Types

Assessment Date  07/11/2016

Clinical Specialties

Accessor         Demo User #1

Clinical Performers

Trainees         Eric Brown

Applicable To

Trainee email list  dreab2003@gmail.com

Scale Types

Assessment Results

Scale Values

| Assessment Item | Value | Credit? |
|---|---|---|
| Prep Supplies/Instruments | Ambu Bag w/mask, ET Tube w/Stylette, 10cc Syringe, Ambu bag to Oxygen, Suction, IV Access | ☐ |
| Check Blade Light | Done | ☑ |
| Check ET Tube Cuff | Done | ☑ |
| Correct Mask Selection | Done Poorly | ☑ |
| Correct Mask | Done | ☐ |

Scales

| ⊜ Care Assess | Messaging | | | | 👤 Demo User #1 ▼ |
|---|---|---|---|---|---|
| metrics ︎medicus | Scale Types | | 🔍 | | ⊗▼ |
| Care Assess | [ Create ] or Import | | More ▼ | | 1-5 of 5 ≡ ▢ |
| Assessments | ☑ | Scale Type | | | |
| Library | ☑ | Categorical Scale | | | |
| Assessment Library | ☑ | Checkbox Scale | | | |
| Trainee Library | ☑ | Data Entry Scale | | | |
| Author Library | ☑ | Milestone Scale | | | |
| Configuration | ☑ | Rating Scale | | | |
| Assessment Types | | | | | |
| Clinical Specialties | | | | | |
| Clinical Performers | | | | | |
| Applicable To | | | | | |
| Scale Types | | | | | |
| Scale Values | | | | | |

FIG. 12A

| ⊜ Care Assess | Messaging | | | | 👤 Demo User #1 ▼ |
|---|---|---|---|---|---|
| metrics ︎medicus | Scale Values | | 🔍 | | ⊗▼ |
| Care Assess | [ Create ] or Import | | More ▼ | 1-80 of 129 ⇦ ⇨ | ⋮ ▢ |
| Assessments | ☑ Scale Type | Scale Value | Value Type | Score | Credit |
| Library | ☑ Categorical Scale | Req Instr/Demo | | -1.0 | Incorrect |
| Assessment Library | ☑ Categorical Scale | Ambu Bag w/mask | | 1.0 | Correct |
| Trainee Library | ☑ Categorical Scale | Incorrect Dose | | -1.0 | Incorrect |
| Author Library | ☑ Categorical Scale | None | | -1.0 | Incorrect |
| Configuration | ☑ Categorical Scale | N/A | | 0.0 | Neutral |
| Assessment Types | ☑ Categorical Scale | Suture | | 1.0 | Correct |
| Clinical Specialties | ☑ Categorical Scale | Prompts/Errors | | -1.0 | Incorrect |
| Clinical Performers | ☑ Categorical Scale | ET Tube w/Stylette | | 1.0 | Correct |
| Applicable To | ☑ Categorical Scale | Incorrect Med | | -1.0 | Incorrect |
| Scale Types | ☑ Categorical Scale | EtCO2 Monitor | | 1.0 | Correct |
| Scale Values | ☑ Categorical Scale | IV Fluids | | 1.0 | Correct |
| Scales | | | | | |

FIG. 12B

| | Care Assess | Messaging | | | | Demo User #1 ▼ |
|---|---|---|---|---|---|---|
| metrics medicus | Scale Values | | 🔍 | | | ⊗▼ |
| | Save or Discard | | | | | ⁞ ▫ |
| Assessments | | | | | 1-80 of 132 | ◁ ▷ |
| Library | | | | | | |
| Assessment Library | ☐ Checkbox Scale | Ketamine 2-4 mg/kg | | | 1.0 | |
| Trainee Library | ☐ Checkbox Scale | Rocuronium 1-1.2 mg/kg | | | 1.0 | |
| Author Library | ☐ Checkbox Scale | < 30 sec | | | 1.0 | |
| Configuration | ☐ Checkbox Scale | 1-3 min | | | 1.0 | |
| Assessment Types | ☐ Checkbox Scale | Done | | | 1.0 | |
| Clinical Specialties | ☐ Checkbox Scale | Consistent | | | 1.0 | |
| Clinical Performers | ☐ Checkbox Scale | 92-94 | | | 2.0 | |
| Applicable To | ☐ Checkbox Scale | Versed 0.3-0.35 mg/kg | | | 1.0 | |
| Scale Types | ☐ Checkbox Scale | < 1min | | | 1.5 | |
| Scale Values | ☐ Checkbox Scale | Done Well | | | 1.5 | |
| Scales | ☐ Milestone Scale ▼ | Level 10 | | ⇕ | 10 | Neutral ⇕ |

FIG. 12C

| metrics medicus | Scales / New | | | | ⁞ ▫ |
|---|---|---|---|---|---|
| Care Assess | Save or Discard | | | | |
| Assessments | | | | | |
| Library | Name | Categorical Scale (Choice A, Choice B, Choice C, Choice D) | | | |
| Assessment Library | Scale Type | Categorical Scale | | | ▼ |
| Trainee Library | Allow Multiple | ☑ | | | |
| Author Library | Standard Score | 1.00 | | | |
| Configuration | Maximum score | 0.00 | | | |
| Assessment Types | Scale Values | | | | |
| Clinical Specialties | | Scale Value | Score | Value Type | Credit |
| Clinical Performers | | — Choice A | 1.0 | | Correct 🗑 |
| Applicable To | | — Choice B | -1.0 | | Incorrect 🗑 |
| Scale Types | | — Choice C | -1.0 | | Incorrect 🗑 |
| Scale Values | | — Choice D | 0.0 | | Neutral 🗑 |
| Scales | | Add an Item | | | |

FIG. 12D

Export Data

This wizard will export all data that matches the current search criteria to a CSV file. You can export all data or only the fields that can be reimported after modification.

Please note that only the selected ids will be exported.

Export Type: [Import-Compatible Export ▼]  Export Formats [CSV ▼]

Available fields

- Assessment Items/Documentation
- Assessment Items/Last Updated by
- Assessment Items/Last Updated on
- Assessment Items/Name
- Assessment Items/Scale
- Assessment Items/Sequence
- Assessment Overview
- Assessment Types
- Authors
- Clinical Performers
- Clinical Specialties
- Created by
- Created on
- Institution/ Organization
- Last Updated by
- Last Updated on
- Title

[Add] [Remove] [Remove All]

Fields to export  Save fields list
Saved exports: [ ▼] [Delete]

- Applicable To
- Assessment Items/Attachments
- Assessment Items/Created by
- Assessment Items/Created on
- Assessment Items/Critical?
- Assessment Items/Depends On
- Assessment Items/Documentation
- Assessment Items/Last Updated by
- Assessment Items/Last Updated on
- Assessment Items/Name
- Assessment Items/Scale
- Assessment Items/Sequence
- Assessment Overview
- Assessment Types
- Authors
- Clinical Performers
- Clinical Specialties
- Created by
- Created on
- Institution / Organization
- Last Updated by
- Last Updated on
- Title

[Close] [Export To File]

< Back US Guided Central Li... SAVE

Q13 Exhange Dilator for Catheter via Guide Wire ✓
DONE

Q14 Maintain Contact w/ Guide Wire ✓
DONE

Q15 Maintain Sterile Field for Wire + Catherer ✓
DONE

Q16 Maintain Sterile Field - US Probe ✓
DONE

Q17 Follow-on Care ✓
CXR, STERILE DRESSING

Q18 Comments ✓
YOUR TECHNIQUE AND PRICEDUAL KNOWLEDGE IS MUCH IMPROVED! WORK ON GAINING EFFICIENCY AND MAINTAINING PATIENT AWARENESS.

Notes

FINISH

ELECTRONIC TASK ASSESSMENT PLATFORM

TECHNICAL FIELD

The present disclosure relates to an electronic task assessment platform. More particularly, the electronic task assessment platform may perform objective assessments of tasks.

REFERENCE TO COMPUTER PROGRAM LISTING APPENDIX

Computer Program Listing Appendix A submitted herewith as a text file contains technical computer program code for implementing an electronic task assessment platform system and method in accordance with an embodiment of the present invention as described more completely below and is hereby incorporated herein by reference in its entirety.

BACKGROUND

Human performance is a major determinant in the safe, high quality and efficient delivery of healthcare. However it remains difficult to conduct human performance assessments in a healthcare environment that objectively, consistently and effectively evaluates the performance of healthcare providers on healthcare related tasks. For example, healthcare providers often perform tasks such as needle insertions, x-rays, and the like; that are critical towards providing safe, high quality care but are difficult to evaluate in an objective way.

Conventional assessments of human performance rely on assessors that are often unable to capture all of the data related to a person's performance on the assessment. For example, conventional assessments are often binary and consist of a checklist of basic items that are scored as being completed/incomplete. The assessments do not provide a way to evaluate the level of proficiency with which the healthcare provider completed the task. Accordingly, there is a need to provide a greater depth of analysis with regards to the completion of assessments.

Moreover, conventional assessments are often completed in non-electronic formats and do not allow for the easy comparison between the performance of a user and meaningful benchmarks. For example, in order to conduct research, researchers manually enter data and information from the non-electronic assessment into spreadsheets and databases. Such conventional assessment techniques are inefficient, time consuming and challenging for data entry, data retrieval and performance analysis. In some cases, conventional assessment techniques may also be unable to obtain all of the necessary information from various sources to accurately assess the performance (for example, data sources may not be electronically linked, data may not be transferred from non-electronic to electronic formats, data that is obtain may be in a format or form that is difficult to analyze or may provide insufficient information). Accordingly, there is a need for systems that provided assessment with improved accuracy and usability.

SUMMARY

The present disclosure is directed towards systems and methods including a first device, a second device and at least one server communicatively coupled to each of the first device and the second device via a network. The first device may include a first user interface and a web browser. The second device may include a second user interface and an assessment application. The server may include a non-transitory memory storing computer-readable instructions and at least one processor. Execution of the instructions, by the at least one processor, may cause the at least one server to provide, on the first device, via the web browser, an assessment builder comprising a plurality of customizable assessment components; receive at least one constructed assessment from the first device, the at least one constructed assessment being constructed from among the plurality of customizable assessment components of the assessment builder via the first user interface; present the at least one constructed assessment to the second device via the assessment application of the second device; receive at least one completed assessment from the second device, the at least one completed assessment including one or more task performance evaluations associated with the presented at least one constructed assessment of the assessment application via the second user interface; generate a report including one or more statistical metrics related to the one or more task performance evaluations based on the received at least one completed assessment; and display, via at least one of the first device and the second device, the generated report.

BRIEF DESCRIPTION OF THE DRAWINGS

FIG. 5C illustrates a grouping portion of a graphical user interface of a web browser used in connection with the system that provides an electronic task assessment platform, according to an aspect of the present disclosure.

FIG. 6 illustrates an first assessment portion of a graphical user interface of a web browser used in connection with the system that provides an electronic task assessment platform, according to an aspect of the present disclosure.

FIG. 7C illustrates a fourth assessment portion of a graphical user interface of a web browser used in connection with the system that provides an electronic task assessment platform, according to an aspect of the present disclosure.

FIG. 8A illustrates a fifth assessment portion of a graphical user interface of a web browser used in connection with the system that provides an electronic task assessment platform, according to an aspect of the present disclosure.

FIG. 8B illustrates a sixth assessment portion of a graphical user interface of a web browser used in connection with the system that provides an electronic task assessment platform, according to an aspect of the present disclosure.

FIG. 8C illustrates a seventh assessment portion of a graphical user interface of a web browser used in connection with the system that provides an electronic task assessment platform, according to an aspect of the present disclosure.

FIG. 9A illustrates an eighth assessment portion of a graphical user interface of a web browser used in connection with the system that provides an electronic task assessment platform, according to an aspect of the present disclosure.

FIG. 9B illustrates a ninth assessment portion of a graphical user interface of a web browser used in connection with the system that provides an electronic task assessment platform, according to an aspect of the present disclosure.

FIG. 9C illustrates a tenth assessment portion of a graphical user interface of a web browser used in connection with the system that provides an electronic task assessment platform, according to an aspect of the present disclosure.

FIG. 9D illustrates an eleventh assessment portion of a graphical user interface of a web browser used in connection with the system that provides an electronic task assessment platform, according to an aspect of the present disclosure.

FIG. 12A illustrates a first scale portion of a graphical user interface of a web browser used in connection with the system that provides an electronic task assessment platform, according to an aspect of the present disclosure.

FIG. 12B illustrates a second scale portion of a graphical user interface of a web browser used in connection with the system that provides an electronic task assessment platform, according to an aspect of the present disclosure.

FIG. 12C illustrates a third scale portion of a graphical user interface of a web browser used in connection with the system that provides an electronic task assessment platform, according to an aspect of the present disclosure.

FIG. 12D illustrates a fourth scale portion of a graphical user interface of a web browser used in connection with the system that provides an electronic task assessment platform, according to an aspect of the present disclosure.

FIG. 13 illustrates an exporting tool portion of a graphical user interface of a web browser used in connection with the system that provides an electronic task assessment platform, according to an aspect of the present disclosure.

FIG. 14 illustrates an importing tool portion of a graphical user interface of a web browser used in connection with the system that provides an electronic task assessment platform, according to an aspect of the present disclosure.

FIG. 20 illustrates an assessment portion for a graphical user interface in accordance with an application used in connection with the system that provides an electronic task assessment platform, according to an aspect of the present disclosure.

FIG. 24 illustrates an assessment portion for a graphical user interface in accordance with an application used in connection with the system that provides an electronic task assessment platform, according to an aspect of the present disclosure.

FIG. 34 illustrates an assessment portion of a graphical user interface in accordance with an application used in connection with the system that provides an electronic task assessment platform, according to an aspect of the present disclosure.

DETAILED DESCRIPTION

The present disclosure is generally directed towards systems and methods for an electronic task assessment platform. The system may include a first computing device, a second computing device, a server and database communicatively coupled by a network. A first computing device may include a web browser configured with an assessment builder that enables the creation of assessments. A second computing device may include an application allowing for a user to complete an assessment. The completed assessment may be provided to a server which includes a statistical analysis module that performs objective evaluations of the completed assessments and generates specialized reports that may be provided to the first computing device and/or the second computing device.

Figure 1:
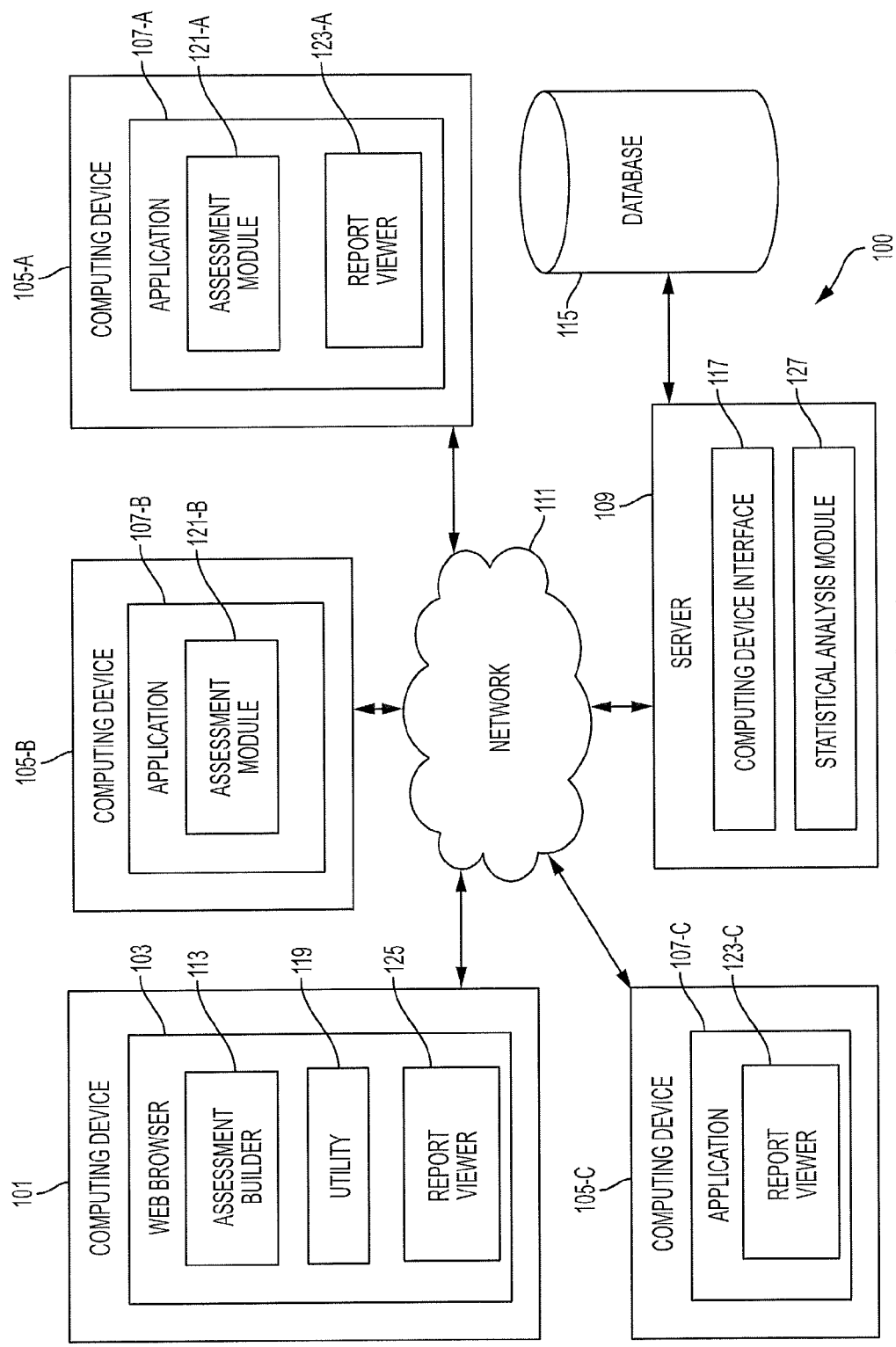
FIG. 1 provides a functional block diagram of an example system that provides an electronic task assessment platform, according to an aspect of the present disclosure.

As illustrated in FIG. 1, a system 100 for providing an electronic task assessment platform is shown, according to an example embodiment. System 100 may include a first computing device 101, a second computing device 105, and at least one server 109. Three non-limiting configurations of a second computing device 105-A, 105-B, or 105-C (generally, 105) of the system 100 are shown. The first computing device 101 and the second computing device 105 may be any suitable computing device such as, without being limited to, a desktop, laptop, tablet, or cell phone. In one embodiment, the electronic task assessment platform includes the first computing device 101, the second computing device 105 and at least one server 109.

The first computing device 101 may include a web browser 103 that provides a user with an assessment builder 113, a utility 119, and a report viewer 125. The second computing device 105 may include an application 107-A, 107-B, or 107-C (generally, 107). In one embodiment, the second computing device 105-A may be configured to include an application 107-A that includes both an assessment module 121-A and a report viewer 123-A. In another embodiment, the second computing device 105-B may be configured to include an application 107-B that includes only an assessment module 121-B. In yet another embodiment, the second computing device 105-C may be configured to include an application 107-C that includes only a report viewer 123-C.

In one embodiment, the report viewer 123 may include a graphical user interface that displays one or more screens and is integrated into an application 107. The report viewer 123 may be optimized to display portions of the report on a mobile device such as a tablet or cellphone. For example, the report viewer 123 may be configured to display a graph per screen, and allow a user to scroll through the various graphs and components of the report. The report viewer 123 may allow a user to zoom or enlarge one or more portions of the displayed graph, or portion of the report.

In one embodiment, the report viewer 125 may be integrated into the web browser 103. For example, the user may view a generated report presented as a document within the web browser 103. Alternatively, the web browser 103 may provide a link to a generated report, and the report viewer 125 may be an application that is capable of displaying the contents of the generated report.

Figure 3:
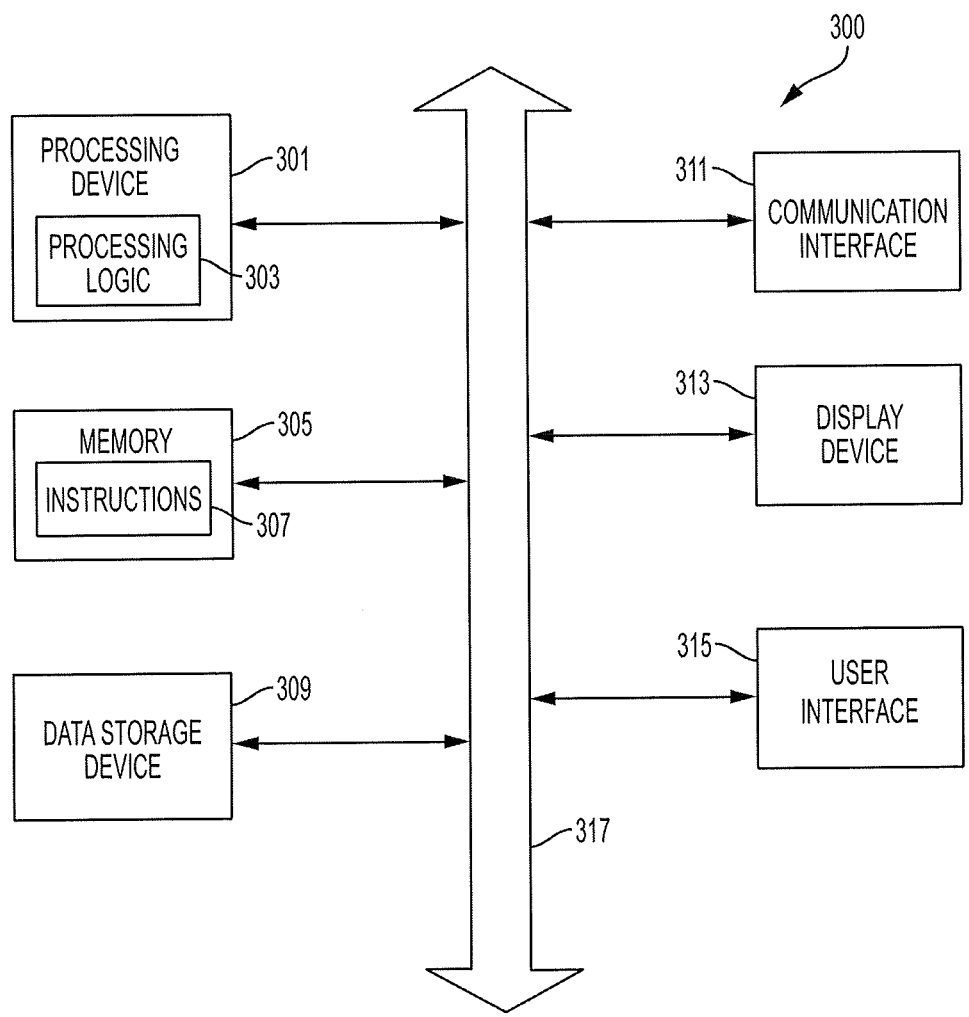
FIG. 3 provides a functional block diagram for an example computing device used in connection with the system shown in FIG. 1 that provides an electronic task assessment platform, according to an aspect of the present disclosure.

The server 109 may be communicatively coupled to each of the first device 101 and the second device 105 via a network 111. In general, server 109 may include non-transitory memory storing computer-readable instructions and at least one processor (such as shown in FIG. 3). Execution of the instructions, by the processor, may cause the server 109 to provide an assessment builder 113 to a user of the first device 101 via the web browser 103. The server 109 may receive, from the first device 101, at least one constructed assessment (described further below).

The server 109 may include one or more computing device interface(s) 117 configured to provide and receive information from any one of the computing devices 101, 105. As will be discussed below, the computing device interface(s) 117 may construct specialized reports that are capable of being viewed on the respective specialized report viewer(s) (125, 123-A, 123-B) of each computing device 101, 105-A, 105-C. The server 109 may provide the assessment builder 113 via the web browser 103 and receive constructed assessments by way of the computing device interface 117. The server 109 may then store the constructed assessment in a database 115 that is communicatively coupled to the server 109. The server 109 may provide the at least one constructed assessment to a user of the second device 105-B, 105-C via an assessment module 121 on the application 107.

A user of the second computing device 105 may include a trainee (who performs the tasks on the assessment) and/or an assessor (who evaluates the performance of the trainee on the tasks of the assessment). The trainee or assessor may use the second computing device 105 to complete and report an assessment retrieved by the assessment module 121. The completed assessment may be transmitted from the second computing device 105 to the server 109 via the computing device interface 117. Once received by the server 109, the server 109 may generate a report including one or more statistical metrics via a statistical analysis module 127. The statistical metrics may be based on the completed assessment received at the server 109 and information stored on the database 115 that is communicatively coupled to the server 109. The generated report may then be provided by the server 109 to a report viewer 123 on the second computing device 105 and/or a report viewer 123 on the first computing device 101.

The statistical analysis module 127 may provide statistics that illustrate, for example, an individual's performance against his or her previous performance on the same set of tasks (same assessment), an individual's performance against a "set score" or passing score, and an individual's performance against the cohort of individuals who have also been assessed using the same assessment. The statistical analysis module 127 may also be a computational module.

Data output by the statistical analysis module 127 may be used to generate a report that graphically illustrates the individual's performance. In one embodiment, the generated report may provide the user with an objective means for evaluating their performance in a particular instant and over time. Additionally, the graphical display of information within the report may allow the user to more quickly interpret and understand the statistical information output by the statistical analysis module 127 compared to conventional technologies (where raw data may be provided without accompanying statistical information, and/or statistical information may be provided in a format that may be difficult for a user to interpret). Furthermore, the statistical analysis module 127 may use data stored in the database 115 to perform the analysis. The data stored in the database 115 may be continuously updated with completed assessments. In one embodiment, the assessment module 121 and the web browser 103 may be configured to be complementary applications that, in one embodiment, are applications on separate computing devices. Although the assessment module 121 and web browser 103 are illustrated herein as being on separate computing devices it is envisioned that in an alternative embodiment, the assessment module 121 and the web browser 103 are on the same computing device.

In one embodiment, the application 107 on the second computing device 105 may include the assessment module 121. The application 107 may provide the user with access to assessments stored in the database 115 (that are communicatively coupled to the server 109). Using the assessment module 121, a user may start, edit, complete and finalize an assessment. Once an assessment is finalized by the user, the second computing device 105 may transmit the completed assessment to the server 109, where it may undergo one or more statistical techniques in accordance with the statistical analysis module 127. The server 109 may provide the application 107 with a statistically driven report that is capable of being graphically displayed in the report viewer 123 of the application 107.

The web browser 103 of the first computing device 101 may include an assessment builder 113 tool, along with a utility 119 that provides a user with the ability to perform administrative tasks. Administrative tasks may include, without being limited to, creating a new user account, activating a site license, entering information for the main user profile, purchasing assessment tools to associate with the license, assigning a designated group of assessors and trainees to form a working group, and the like. The web browser 103 may also include a report viewer 125 configured to allow a user of the first computing device 101 to view reports on completed assessments received from the server 109.

The assessment builder 113 may include a custom designed graphical user interface that allows a user to connect assessment items (i.e., questions or tasks) with assessment scales (i.e., yes/no, numerical Likert scales, categorical scales and the like) and weightings (i.e., importance of the question). A grouping of assessment items may form an assessment instrument (i.e., a quiz, test) and may also be referred to herein as an assessment. Each assessment item may be associated with a media documentation that may be required to be submitted to indicate completion of the assessment item. In some embodiments, the media documentation may be graded in connection with the assessment item. Media documentation may include one or more of an image, video, audio, and the like. Media documentation may be submitted and stored in electronic or physical formats. In this manner, the user may generate specialized assessments that include the appropriate scales and place emphasis on the appropriate questions.

In one embodiment, a method using the systems described herein may determine desirable data required for tracking performance assessments for various fields including, for example, medicine, surgery, nursing, dentistry, pharmacy, physical therapy, emergency management services, and the like. A method using the systems described herein may include assessments that correspond to standardized examinations associated with one or more of the fields above. For example, the questions or instruments contained within the assessments may correspond with the United States Medical Licensing Examinations (USMLE).

Using the web browser 103, a user may access the assessment builder 113 to construct one or more assessments. Completed assessment information may be transmitted to the server 109 for storage on database 115. Existing assessments stored on the database 115 may be accessed, modified, and deleted through the web browser 103. A modification of an existing assessment may result in the replacement of the database entry for a particular assessment with a new database entry for a new assessment that includes the modification. The collection of assessments stored on the database 115 may span numerous specialties, roles and practice domains.

Using the web browser 103, a user may also copy an assessment instrument. The assessment instrument may be copied (and optionally edited) into a new database entry and saved as a new version or with a new title.

One or more assessments may be grouped together as a product. Products (or groupings of assessment instruments) may be stored with information related to the assessment items contained in the assessment instrument, and the medical specialty to which the assessment instruments may be applied. Products may be stored in the database 115 with titles and specialty information (i.e., a description of the fields the assessment is applicable for).

The database management system may include portfolios or contain one or more data entries that together represent the longitudinal record of an individual trainee's performance on all the assessment instruments. The database management system may also include a collection of portfolios or a group of portfolios. For example, the system may include a collection or group of longitudinal records for a specific population such as, for example, a group of nurses, first year emergency medicine residents, and the like.

Using the utility 119 of the web browser 103 a user may complete administrative tasks such as registering for accounts, registering trainees and registering assessors. The utility 119 may also be configured to allow a user to purchase a license to gain access to instruments stored on the database 115.

In one embodiment, the system 100 includes a second computing device 105 having an application 107 that allows a user to access and complete assessments stored in the database 115. In one embodiment, a user may provide login information via the application 107. Upon providing the proper login information the user (trainee or assessor) may be provided with a list of assessments available to the user. The user may then select the desired assessment instrument they wish to complete. The user may then respond to one or more of the assessment items (i.e., questions) within the assessment instrument. After completing the assessment instrument, the user may elect to submit the assessment. When the user elects to submit the assessment, the assessment may be transmitted from the second computing device 105 to the server 109 via network 111.

The server 109 may generate a report using the statistical analysis module 127, provide the report in a specialized format capable of being displayed on the report viewer 123 of the second computing device 105 and transmit the report to the second computing device 105. The report may be viewed by the user (trainee or assessor) on the second computing device 105 in a format that is suitable for display on the second computing device 105.

Additionally, another version of the report may be viewed via a web browser 103 on a separate computing device. For example, the report may instantly display in an application on a user's cell phone and a copy of the report may be emailed to the user and viewed from a separate computing device. In one embodiment, data captured from the assessment may be analyzed and displayed instantly on the second computing device 105 (e.g., a mobile device) at the same time a PDF report is automatically generated and emailed to the trainee.

The generated reports may be archived on the database 115. Archived reports may also be downloaded using a computing device via the web browser. Archived reports may also be available to the statistical analysis module 127 for futures statistical comparisons.

In one embodiment, the reports generated by the server 109 (formatted for display via a web browser 103 or application 107) on a computing device may include information about the assessment and the actual data that was captured during the assessment. Information in the report may include the assessment name, name of the assessor, and the name of each of the trainees who completed the assessment. Additionally, other items may be included for each item on the assessment, such as the name of the assessment item, corresponding scale value(s) or data entry value for the assessment item, the score associated with the selected scale values, standard score for the assessment item, a checkbox indicating whether credit was received for the item, and a checkbox indicating whether the assessment item may be considered a critical item.

Additionally, the report may include statistical information related to the assessment. In one embodiment, the report may include information about the trainee's performance on an assessment and the assessment itself. For example, the report may include the trainee score, total possible score, total possible score percentage, total trainee credited items, total critical items passed, total critical items, total critical items percentage, and the like. In one embodiment, the trainee score may be defined as the aggregate score for the trainee for each of the assessment items. The total possible score may be defined as the sum of the maximum score for each of the assessment items. The total possible score percentage may be defined as the trainee score divided by the total possible score and multiplied by a factor of 100. The total trainee credited items may be defined as the number of assessment items for which the trainee received credit. The total critical items passed may be defined as the number of assessment items that are designated as critical for which the trainee received credit. The total critical items may be defined as the number of assessment items that are designated as critical. The total critical items percentage may be defined as the total critical items passed divided by the total critical items multiplied by a factor of 100.

In one embodiment, the report may include information about the trainee's performance on an assessment in comparison to other trainees who have completed the same assessment. Accordingly, in one embodiment, the report may include a standard score, standard score percentage, total standard credited items, total standard credited items percentage, and the like. The standard score may be defined as the minimum acceptable score for the item. The standard score percentage may be defined as the trainee score divided by the standard score and multiplied by a factor of 100. The total standard credited items may be defined as the number of assessment items for which it was possible to receive credit. The total standard credited items percentage may be defined as the total trainee credited items divided by the total standard credited items multiplied by a factor of 100.

In one embodiment, the statistical analysis module 127 may generate a report that includes an assessment instrument score. The assessment instrument score may be a value that reflects the relative correctness of the response to each assessment item within the assessment instrument. The scores for each assessment item may be adjusted to reflect the complexity of the task using a multiplier. In one embodiment, the multiplier may be applied before or after scoring is completed. In one embodiment, the assessor may select the multiplier (based on the complexity of the task). In another embodiment, the user constructing the assessment using the assessment builder may set the multiplier. In one embodiment, the assessment multiplier may be 1.

In one embodiment, the generated report may include a graphical representation of the performance of an assessed individual (i.e., trainee score) for each assessment item. The generated report may also display the standard score for an assessment item. The standard score may be plotted on a bar graph for each assessment item. In one embodiment, the scores for all trainees who have been assessed for each assessment item may be calculated from the total population of people scored to determine the average cohort score for every assessment item. In one embodiment the cohort score for each assessment item may be plotted on a bar graph of the report along with an indication of the total number of people assessed.

In one embodiment, the generated report may display an indication of a trainee's progress by plotting a trainee's earlier scores for an assessment item alongside newer scores in a bar graph. The bar graph may also indicate the total number of times the trainee achieved the indicated score.

The server 109 may store data and information related to the received completed assessment on database 115. For example, the server 109 may store information related to the state of the assessment (e.g., Draft, Cancelled, Complete, Archived), a link to the original assessments, a link to the profile of the trainee who completed the assessment, links to the profiles of each trainee who completed the same assessment, data and time information related to the completed assessment, notes visible to the assessor, and notes visible to the assessor and/or trainee. For each question on assessment instrument, the server 109 may store one or more pieces of information. For example the server may store a link to the original assessment item from the instrument, a link to the scale value(s) selected by the assessor, any numeric or text values that were entered by the assessor for the completed assessment item, a link to any attachments that were entered by the assessor, and a calculated field to determine the numeric score for this item, based on the selected scale value(s).

Each of the computing device interfaces 117 may generate a report that is optimized for display on the specialized computing device. For example, if the second computing device 105 is a mobile computing device such as a tablet and/or cell phone, the report may be configured for display within the report viewer 123 of the application 107. For example, if the first computing device 101 is a desktop or laptop computer, the report may be configured for display using a report viewer 125 of the web browser 103. Alternatively, the report may be emailed and available for download.

In one embodiment, the server 109 and network 111 may utilize a cloud-based infrastructure such as that provided by Amazon Web Services (AWS). In one embodiment, the software stack may use a Linux Operating System. Optionally additional components may be installed. For example, in one embodiment, the software stack may utilize Ubuntu with nginx (for the encryption layer), PostgreSQL (for the database), and Python (for the programming language and interpreter). The data stored, organized, and subsequently retrieved from the database 115 may be done so using PostgreSQL. All non-attachment data may be stored inside of PostgreSQL, while attachments such as multimedia files may be stored directly in the filesystem and linked to from the PostgreSQL structure. In one embodiment, software on the server 109 may be written in Python, while software configured for the web browser 103 may be written in JavaScript. Aspects of the web browser 103 may be developed in XML, stored in the PostgreSQL database 115 and then translated into the Hypertext Markup Language (HTML) and/or Cascading Style Sheets (CSS) for the browser 103 to render. Data may be stored, retrieved, archived and indexed, for example, within the PostgreSQL database and may be converted to Python objects when pulled out of the database.

In an example embodiment, the server 109 and the application 107 may communicate using a JavaScript Object Notation (JSON)-remote procedure call (RPC) protocol. In one embodiment, the protocol may be optimized for security to only allow instruments and assessments that belong to the currently logged in user to be visible. In one embodiment, the application 107 may utilize a local database, such as Realm, to persist the data locally. For example, when data is sent to the application 107 it may be converted from Python objects to JSON objects. The application may parse the JSON objects to create Objective C objects that are stored in a local Realm database. Any suitable alternatives to the above may be used.

Components of system 100, according to the present disclosure, may be carried out on various mobile devices, such as tablet computers (e.g., Apple iPad, Samsung Galaxy Tab, etc.), smart phones (e.g., Apple iPhone, Blackberry Phone, Android Phone, etc.), smart watch (e.g., Apple Watch, etc.) Personal Digital Assistants (PDAs), Personal Computer devices (PCs; through web browser and installable software) and other similar devices. The mobile devices may be connected over a network such as a Local Area Network (LAN), Wide Area Network (WAN), digital subscriber line (DSL), wireless networks (e.g., 3G or 4G networks), or other equivalent connection means. The mobile devices may communicate over the network using programs or applications ('App' or 'Apps'). In one example embodiment, methods of the present disclosure may be carried out by an App running on one or more mobile devices and a web browser running on a stationary computing device.

The term "computing device" as used herein is intended for all purposes to be interpreted broadly and is defined for all uses, all devices, and/or all systems and/or systems in this disclosure as a device comprising at least a central processing unit, a communications device for interfacing with a data network, transitory computer-readable memory, and/or a non-transitory computer-readable memory and/or media. The central processing unit carries out the instructions of one or more computer programs stored in the non-transitory computer-readable memory and/or media by performing arithmetical, logical, and input/output operations to accomplish in whole or in part one or more steps of any method described herein. A computing device is usable by one or more users, other computing devices directly and/or indirectly, actively and/or passively for one or more suitable functions herein. The computing device may be embodied as computer, a laptop, a tablet computer, a smartphone, and/or any other suitable device and may also be a networked computing device, a server, or the like. Where beneficial, a computing device preferably includes one or more human input devices such as a computer mouse and/or keyboard and one or more human interaction device such as one or more monitors. A computing device may refer to any input, output, and/or calculating device associated with providing a virtual reality experience to one or more users. Although one computing device may be shown and/or described, multiple computing devices may be used. Conversely, where multiple computing devices are shown and/or described, a single computing device may be used.

Figure 2:
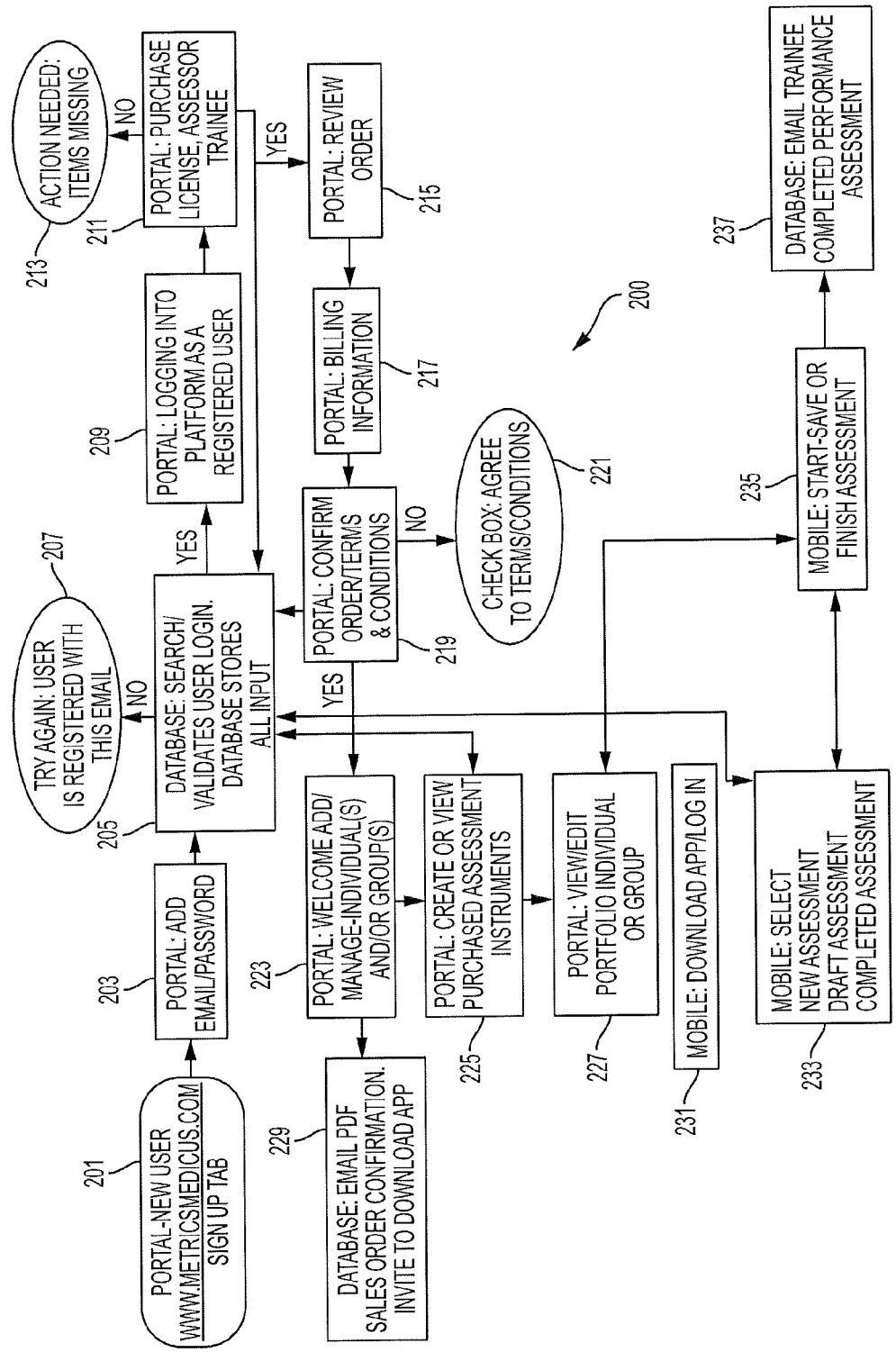
FIG. 2 provides a flowchart diagram of the example system that provides an electronic task assessment platform, shown in FIG. 1, according to an aspect of the present disclosure.

FIG. 2 provides an example database centric flowchart diagram 200 of system 100 for providing an electronic task assessment platform. As illustrated in FIG. 2, a new user may sign up for an account (201) using a web browser 103. The new user may enter an email and/or password (203). A server 109 may access the database 115 to perform a search or other function in order to verify a user's provided login information (205). The database 115 may store information for any new users. If the user's email is present within the database 115, in one embodiment, the user may not be able to register a new account (207).

After the user's provided information is validated by the database 115, the user may be granted access to a web browser 103 on the graphical user interface and platform as a registered user (209). The web browser 103 may allow the user to purchase licenses or determine settings for assessors and/or trainees (211). The user may also be alerted by the web browser 103 that the user is required to provide information to the web browser (213). If the user purchases a license, the user may review the order using the portal (215). The user may be presented with and requested to provide billing information (217) and confirm the order and terms and conditions of the transaction (219). In one embodiment, the user may be required to agree to terms and conditions (221) using a check box or similar graphical user interface element. Purchased licenses, order confirmation and terms and condition information may be stored within the database 115.

The web browser 103 may welcome a user and allow a user to add or mange individuals and/or groups (223). The web browser 103 may allow a user to create and/or view purchased assessment instruments (225). The web browser 103 may allow a user to view or edit portfolios of individuals and/or groups (227). After receiving confirmation of an order and terms and conditions from a user via the web browser 103, the server 109 may store the confirmation in the database 115. The database 115 may then email a copy of the sales order confirmation to the user (229). Additionally, the server 109 may email an invitation to a user to download an application 107 on a second computing device 105.

Using a second computing device 105, such as a mobile computing device, a user may download an application 107 and login to the application (231). Using the second computing device 105, the user may access new assessments, assessments that are in a draft status, or completed assessments (233). Using the second computing device 105, the user may start, save, or finish an assessment (235). The completed assessment may be transmitted to a database 115, and the trainee's completed performance assessment may be emailed from the database 115 (237).

FIG. 3 illustrates a functional block diagram of a machine in the example form of computer system 300, within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, each of the first computing device 101, the second computing device 105 and server 109 may be implemented by the example machine shown in FIG. 3 (or a combination of two or more of such machines).

Example computer system 300 may include processing device 301, memory 305, data storage device 309 and communication interface 311, which may communicate with each other via data and control bus 317. In some examples, computer system 300 may also include display device 313 and/or user interface 315.

Processing device 301 may include, without being limited to, a microprocessor, a central processing unit, an application specific integrated circuit (ASIC), a field programmable gate array (FPGA), a digital signal processor (DSP) and/or a network processor. Processing device 301 may be configured to execute processing logic 303 for performing the operations described herein. In general, processing device 301 may include any suitable special-purpose processing device specially programmed with processing logic 303 to perform the operations described herein.

Memory 305 may include, for example, without being limited to, at least one of a read-only memory (ROM), a random access memory (RAM), a flash memory, a dynamic RAM (DRAM) and a static RAM (SRAM), storing computer-readable instructions 307 executable by processing device 301. In general, memory 305 may include any suitable non-transitory computer readable storage medium storing computer-readable instructions 307 executable by processing device 301 for performing the operations described herein. Although one memory device 305 is illustrated in FIG. 3, in some examples, computer system 300 may include two or more memory devices (e.g., dynamic memory and static memory).

Computer system 300 may include communication interface device 311, for direct communication with other computers (including wired and/or wireless communication), and/or for communication with network 111 (see FIG. 1). In some examples, computer system 300 may include display device 313 (e.g., a liquid crystal display (LCD), a touch sensitive display, etc.). In some examples, computer system 300 may include user interface 315 (e.g., an alphanumeric input device, a cursor control device, etc.).

In some examples, computer system 300 may include data storage device 309 storing instructions (e.g., software) for performing any one or more of the functions described herein. Data storage device 149 may include any suitable non-transitory computer-readable storage medium, including, without being limited to, solid-state memories, optical media and magnetic media.

Figure 4:
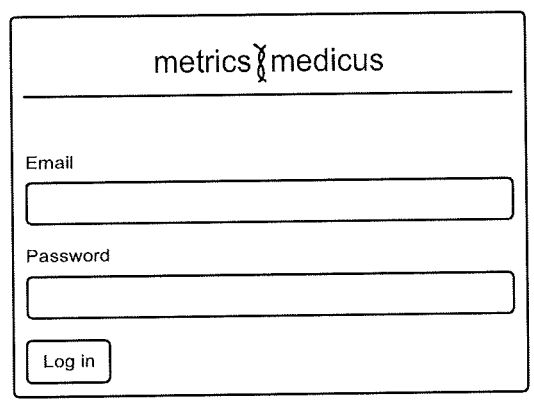
FIG. 4 illustrates a login portion of a graphical user interface of a web browser used in connection with the system that provides an electronic task assessment platform, according to an aspect of the present disclosure.

We turn now to FIGS. 4-14 which illustrate example aspects of a graphical user interface provided to a user by the assessment builder 113 and utility 119 of the web browser 103 of the first computing device 101. Using the utility 119, users may be prompted to register for an account. As illustrated in FIG. 4, alternatively, or in future visits, users may be requested to enter their email address and password to login to a secure portion of the web portal (i.e., web site or web page) provided by the web browser 103.

Figure 5A:
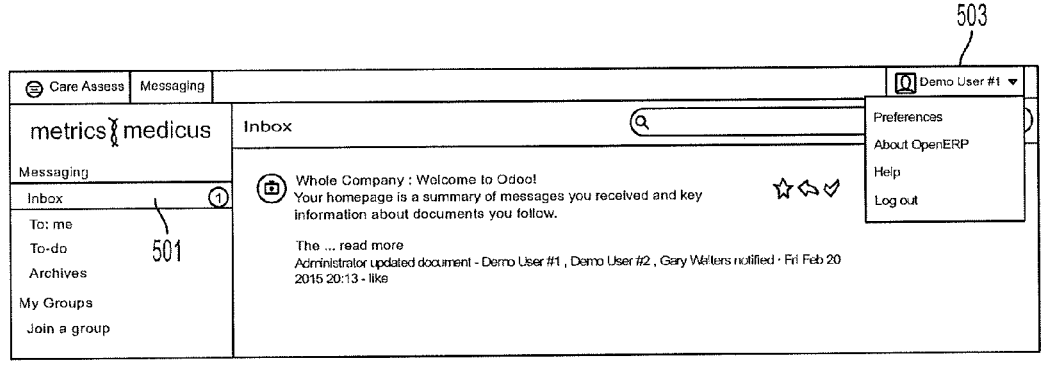
FIG. 5A illustrates a messaging portion of a graphical user interface of a web browser used in connection with the system that provides an electronic task assessment platform, according to an aspect of the present disclosure.
Figure 5B:
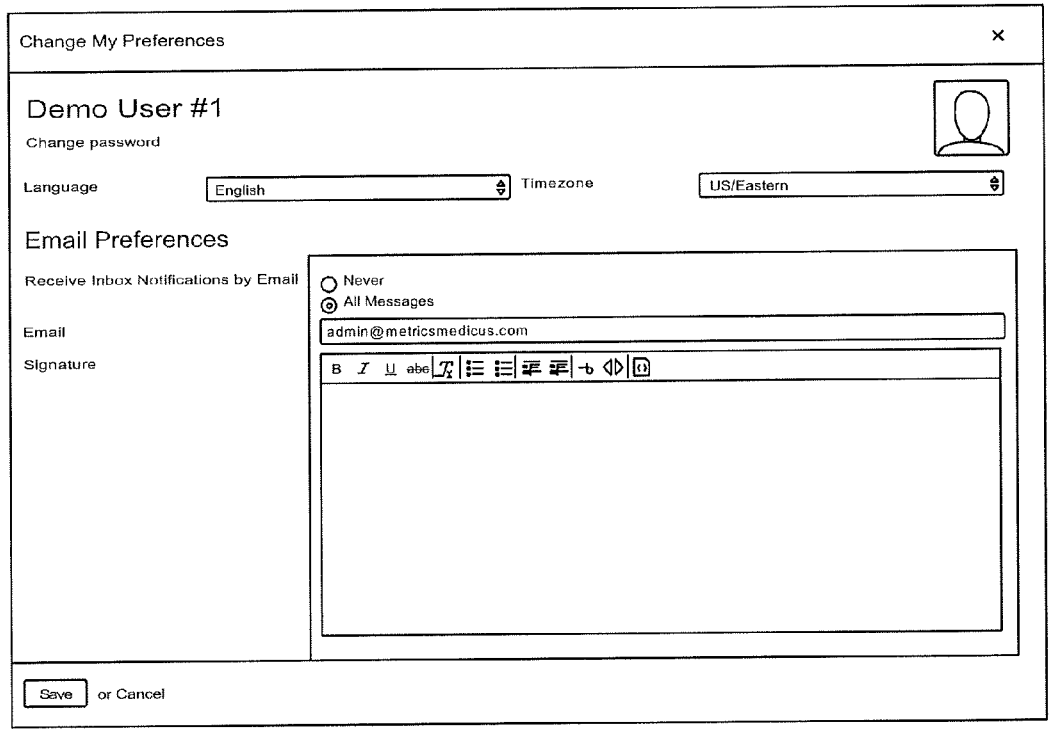
FIG. 5B illustrates a second messaging portion of a graphical user interface of a web browser used in connection with the system that provides an electronic task assessment platform, according to an aspect of the present disclosure.

In one embodiment, as illustrated in FIGS. 5A and 5B, the web site may include a messaging application that supports communications within an institution. The messaging function may facilitate inter-institutional sharing of information, questions, discussions, etc. for all users affiliated with an institution. Inbox messages are viewed by clicking on portions of the web site which cause the website to display the message contents in a content field 501. Users may set their own preferences for messaging communications by selecting a preferences option from a menu present on the home page 503. Users may set their own preferences including language, time zone, and email preferences for inbox communications within the web portal. They may also add an image identifier. To modify the preferences, users may select menu options or text fields and input their responses. Modifications may then be saved or canceled using the menu items.

Figure 5C:
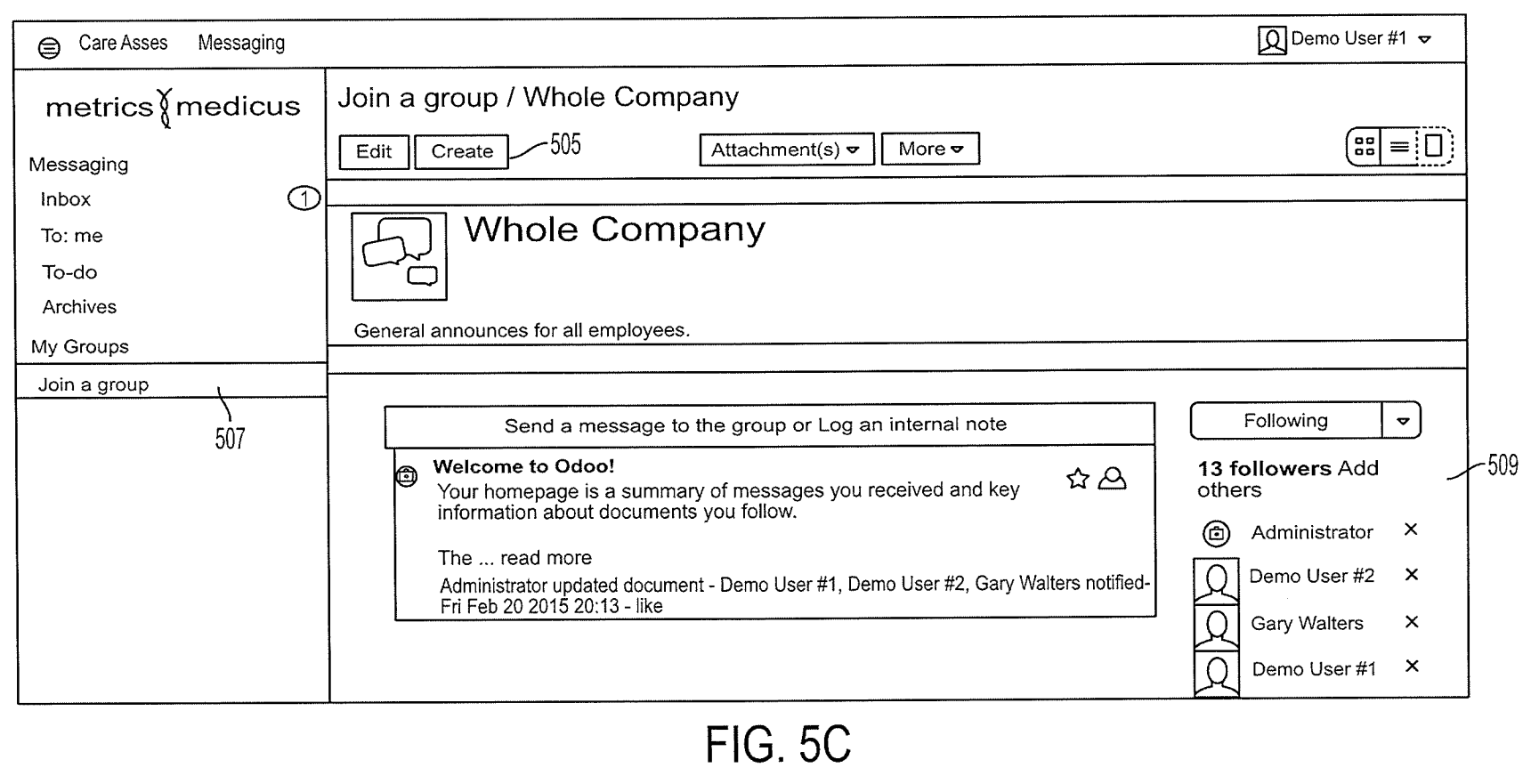

As illustrated in FIG. 5C, the messaging application may also allow users to create and join specific groups within an institution. This facilitates focused communications between groups with a common interest or responsibilities. For example, critical care nurses within a hospital might form a group to discuss issues common to their particular responsibilities. Likewise, residents from a particular specialty could form a group to address concerns specific to their responsibilities and practice community. As illustrated, to create a group, users may select "CREATE" 505 from the top menu and follow the prompts to establish the group. To join a group, users select the "JOIN A GROUP" 507 option from the side bar menu and follow the prompts to join the selected group. Members of the group are shown in the "FOLLOWING" 509 list at the lower right of the window.

As illustrated in FIG. 6, after logging into the site, the user may be presented with a homepage that provides links to Assessments. As illustrated in FIG. 6, a menu may list all assessments that have been completed by the user may and include assessment information such as the name of the assessment, the date of the assessment, and the status of the assessment. The status of the assessment may be either draft, cancelled, archived, or complete. The website may be configured to allow a user to select assessments using checkboxes or the like. The website may include a search utility that may allow a user to search a directory of completed assessments for a particular attribute. The search utility may include advanced search options such as filters or keyword searching. The website may be configured such that, after running a search, only those assessments with the specified search parameters may be displayed in the assessments window.

Figures 7A, 7B:
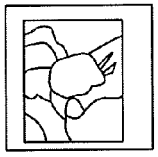
FIG. 7A illustrates a second assessment portion of a graphical user interface of a web browser used in connection with the system that provides an electronic task assessment platform, according to an aspect of the present disclosure.
FIG. 7B illustrates a third assessment portion of a graphical user interface of a web browser used in connection with the system that provides an electronic task assessment platform, according to an aspect of the present disclosure.

As illustrated in FIG. 7A a user may click on any assessment in the assessments window to view the outcomes of the assessment. Within an open assessment, outcomes for any assessment item can be viewed by clicking on the item. Scoring and supporting documentation (image, audio, video, pdf) that may be attached to the record will be displayed as shown in FIG. 7B.

In one embodiment, if the assessment is complete, it may not be edited or otherwise modified as illustrated in FIG. 7C. The assessment may be canceled by selecting an option to "CANCEL ASSESSMENT" 701 in the menu bar. The status of the completed assessment will change to "CANCELLED". The user may print the Assessment Report by selecting the "PRINT" menu item 703. In one embodiment, the assessment report may be generated as a standard PDF document that can be printed, saved or emailed. The user may also add an attachment to the assessment, such as a media file or other document that may provide supplemental information about the assessment. To add an attachment, the user may select an "ATTACHMENT(S)" menu item 705. In one embodiment, the ability to add an attachment to an assessment after it is completed may be available only via the report viewer 125 and/or utility 119 on the web browser 103 of the first computing device 101.

Additional features may be provided under the "MORE" 707 menu option. The user may resend the assessment report to the individuals who were assessed. The assessment may also be deleted by a system administrator. The assessment may also be archived. To facilitate ease of access to records and longitudinal comparisons, in one example, archived assessments may be accessible using a sidebar menu of the web page, but may be separate from completed assessments. The web portal may also facilitate the ability to manage post-assessment reports by sending the assessment report to the individuals who were assessed and designated others via the "RESEND ASSESSMENT REPORT" 709 menu option.

Figures 8A, 8B, 8C:
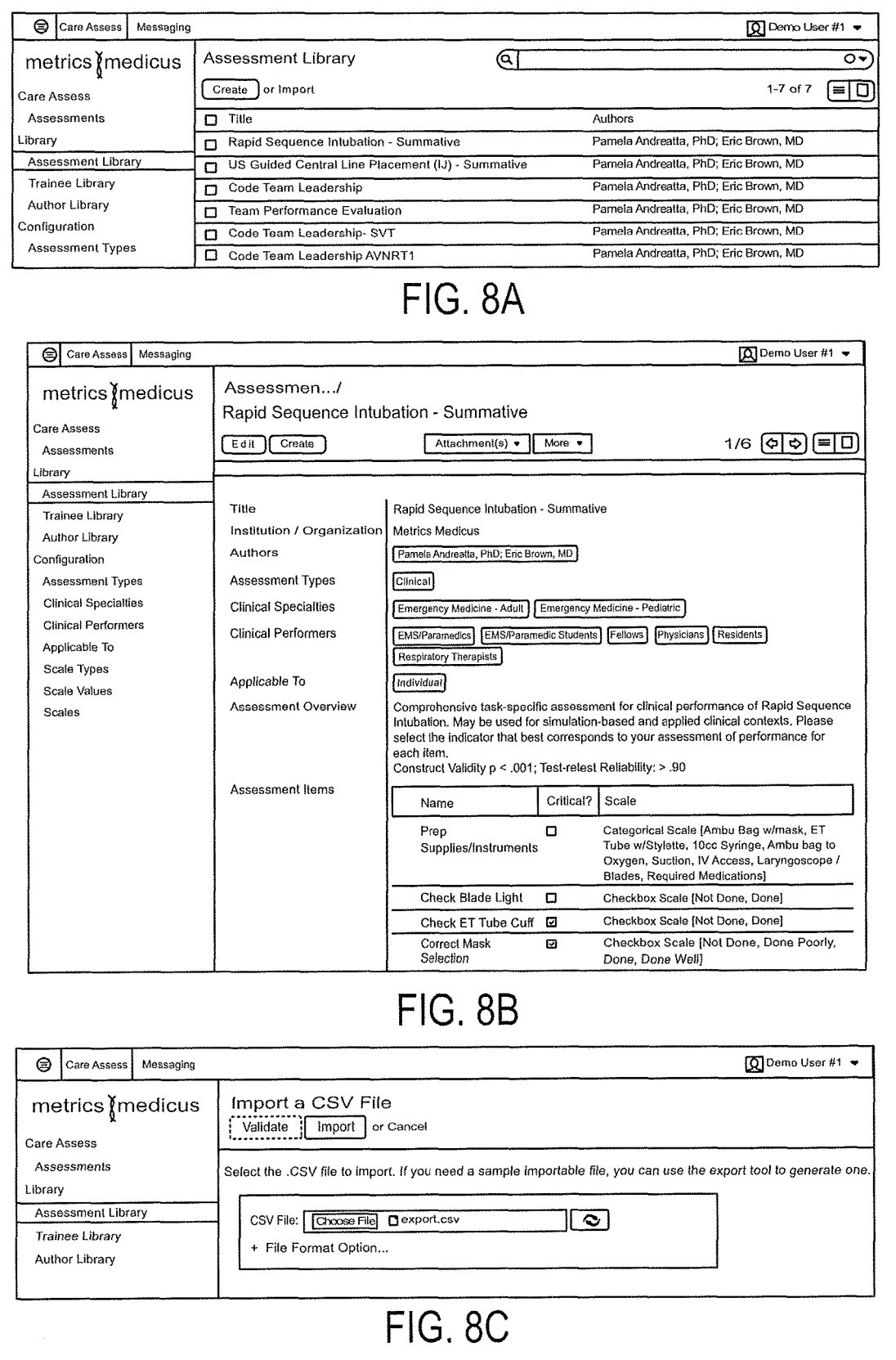

As illustrated in FIG. 8A, the web browser 103 may display assessments in an assessment library. The assessment library may contain all assessments that the user has either created or purchased a license to use. The assessments may be listed by title and author(s). To view a single assessment, the user may click on the title to open it in the content window.

The targeted assessment will open and display all the elements associated with the selected instrument as is illustrated in FIG. 8B. Elements may include one or more of a title, institution/organization, author, assessment type, clinical specialties, clinical performers, applicable to, assessment overview, assessment items, and the like. The title element may be defined as the title of the assessment instrument. The institution or organization element may be defined as the institutional or organizational affiliation associated with the assessment instrument. The author element may be defined as the authors of the assessment instruments. The assessment type element may be defined as the type of assessment associated with the instrument (e.g. Clinical). The clinical specialties element may be defined as the clinical specialties that the assessment instrument applies to (e.g. Critical Care Medicine). The clinical performers element may be defined as the clinical performers that the assessment instrument applies to (e.g. Nurse Practitioner). The applicable to element may be defined as the applicability for individual, team, or both performances. The assessment overview element may include a description of the assessment instrument, including psychometric characteristics (if available). The assessment items element may include the collection of expected performance requirements and associated criteria scales for each item, including critical items and scoring metrics. An assessment can be edited, created, deleted, duplicated and the like. Additionally, attachments may be added to an assessment.

In one embodiment, as illustrated in FIG. 8C, to add to the assessment library, the user may create a new assessment, import an assessment from an archived exported file, or import a licensed purchase. To import an assessment instrument, the user may select an "IMPORT" menu item and follow the prompts to choose the file, validate the data structure, and import the instrument into the library. The interface will load the data from the file and prompt the user to validate the data structure by selecting the "VALIDATE" menu item. After the data structure of the selected file is confirmed, the user may select the "IMPORT" menu item to add the new assessment instrument to the library.

Figures 9A, 9B:
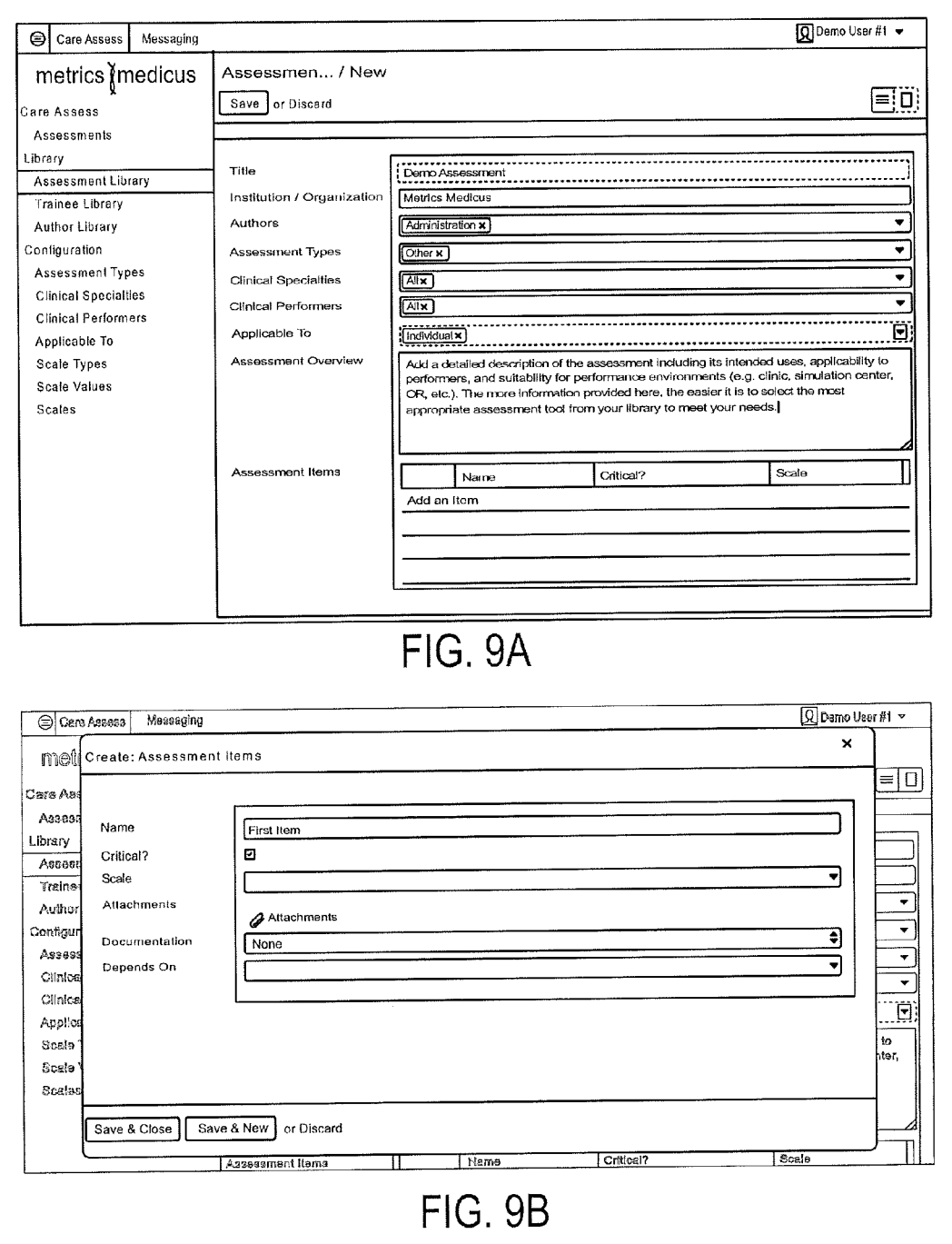

As illustrated in FIG. 9A, the user may use the assessment builder 113 to create a new assessment. In one embodiment, the assessment builder 113 may load a template for creating an assessment instrument includes editable text fields as well as pre-populated menu items that may facilitate easy development of targeted assessment instruments for application with specific communities, groups, and individuals. The template may be saved to the Assessment Library at any point during its creation by selecting a "SAVE" menu item. To reload the saved assessment instrument and add to it, the user may select "EDIT" and may follow the processes described herein for editing an assessment.

As illustrated in FIG. 9A, the new assessment may include a title, institution/organization, and authors. A new assessment may also include an assessment type that describes the primary performance context being measured by the assessment instrument. In an example embodiment The Assessment Types configuration directory may be pre-populated with four options that are commonly used in healthcare performance assessment: Clinical; Procedural; Professional; and Other. Clinical assessment types refers to performance within the context of providing clinical care. Procedural assessment types refers to performance within the context of carrying out procedures. Professional assessment types refers to performance associated with professionalism in the care provider role and work environment. Other assessment type refers to performance that may not easily fit in the other assessment type categories. In one embodiment, more than one assessment type may be assigned to an instrument. Alternative or additional assessment types may be used. Assessment types may be stored in records in the database 115. The assessment type records may be selected, imported, created, exported, and/or deleted.

The new assessment may also include a clinical specialties element that describes the healthcare specialties that are associated with the primary performance context being measured by the assessment instrument. Clinical specialties may include one or more of the following: All, Administration, Anesthesiology, Cardiology, Cardio-Thoracic Surgery, Critical Care Medicine, Dentistry/Maxillofacial, Dermatology, Emergency Medicine—Adult, Emergency Medicine—Pediatric, EMS/Paramedic, Family Medicine, General Medicine, General Surgery, GME, CME/CE, Gynecology, Internal Medicine, Interventional Radiology, Laboratory Medicine, Medical Education, Neurology, Neurosurgery, Nursing, Nursing Education, Obstetrics/Midwifery, Oncology, Orthopaedic Surgery, Otolaryngology, Pathology, Pediatric Medicine, Pharmacology/Pharmacy, Physical Medicine/Rehabilitation, Psychiatry/Psychology, Pulmonary Medicine, Radiation Oncology, Radiology, Radiological/Imaging, Respiratory Therapy, Social Work, Surgical Sub-Specialty, and Urology.

In one embodiment, clinical specialties may be stored in a Clinical Specialties Configuration Directory contained within the database 115. Values from the Clinical Specialties Configuration Directory may be used to populate aspects of the assessment builder 113 in the web browser 103. For example, clinical specialties may be visible in the pull down menu for the user to select. If the desired clinical specialties are not listed in the menu, the user may use the Search option in the menu to either select from the Clinical Specialties Configuration Directory or "CREATE" to add a new clinical specialty to the Clinical Specialties Configuration Directory. In one embodiment, more than one clinical specialty may be assigned to the instrument.

The new assessment may also include a clinical performers element that describes the healthcare professional roles that are associated with the primary performance context being measured by the assessment instrument. Clinical Performers may include healthcare professionals such as Clinical Administrators, Clinical Educators, Advanced Practice Nurses, Advanced Practice Nursing Students, Physician Assistants, Physician Assistant Students, Allied Health, Allied Health Students, Dentists, Dental Students, EMS/Paramedic, EMS/Paramedic Students, Fellows, Interns, Medical Students, Midwives, Midwifery Students, Nurses, Nursing Students, Other, Occupational Therapists, Occupational Therapy Students, Orthodontists, Orthodontic Students, Pharmacologist/Pharmacists, Pharmacology/Pharmacy Students, Physical Therapists, Physical Therapy Students, Physicians, Clinical Psychologists, Clinical Psychology Students, Residents, Respiratory Therapists, Respiratory Therapy, Surgeons, and the like. A list of clinical performers may be stored within a clinical performers configuration directory stored on the database 115. If there are clinical performers stored in the Clinical Performers Configuration Directory, they may be visible in the pull down menu for selection. If the desired clinical performers are not listed in the menu, the user may use the Search option in the menu to either select from the Clinical Performers Configuration Directory or "CREATE" to add a new clinical performer to the Clinical Performers Configuration Directory. The Clinical Performers Configuration Directory may be stored in database element 115. In one embodiment, more than one clinical performer may be assigned to an instrument.

The new assessment may also include an applicable to element that describes whether the primary focus of performance being measured by the assessment instrument is for individuals, teams, or other. An Applicable To configuration directory stored in database 115 may be pre-populated with three options: Individual; Team; and Other. An individual designation may refer to a performance by a single person within the specified context. A team designation may refer to performance by a group of people within the specified context. Additionally, an Other designation may refer to performance by entities that may not easily fit the description of an individual or team (e.g. institution; public health program, etc.). In one embodiment, more than one applicable to designation may be assigned to an instrument.

In one embodiment, the new assessment may include an assessment overview element that may be used to provide a description of the assessment instrument, its intended applications (e.g. simulated training environment; applied clinical practice; field-based clinical care, etc.), and relevant psychometric characteristics (if available). The user may enter in the desired information in each field.

As illustrated in FIGS. 9A and 9B, to add assessment items, a user may click on an "ADD AN ITEM" menu option (FIG. 9A) which launches a pop-up menu for entering the elements associated with the assessment item (FIG. 9B). The pop-up menu, shown in FIG. 9B, may include a name assessment item field, a critical item designation (i.e., whether or not an item that is essential for the performer to correctly perform), and an item scale (i.e., the metric mechanism by which the primary performance associated with the assessment item is measured). Possible item scales may be stored in a scales type configuration directory on the database 115.

The scale values may be established by a user via the assessment builder 113. In general, scale values are elements that include the measurement system of a scale type. They provide the discrete selection options for an assessor to choose from when implementing an assessment. Each scale type will have one or more scale values associated with it.

Figures 9C, 9D:
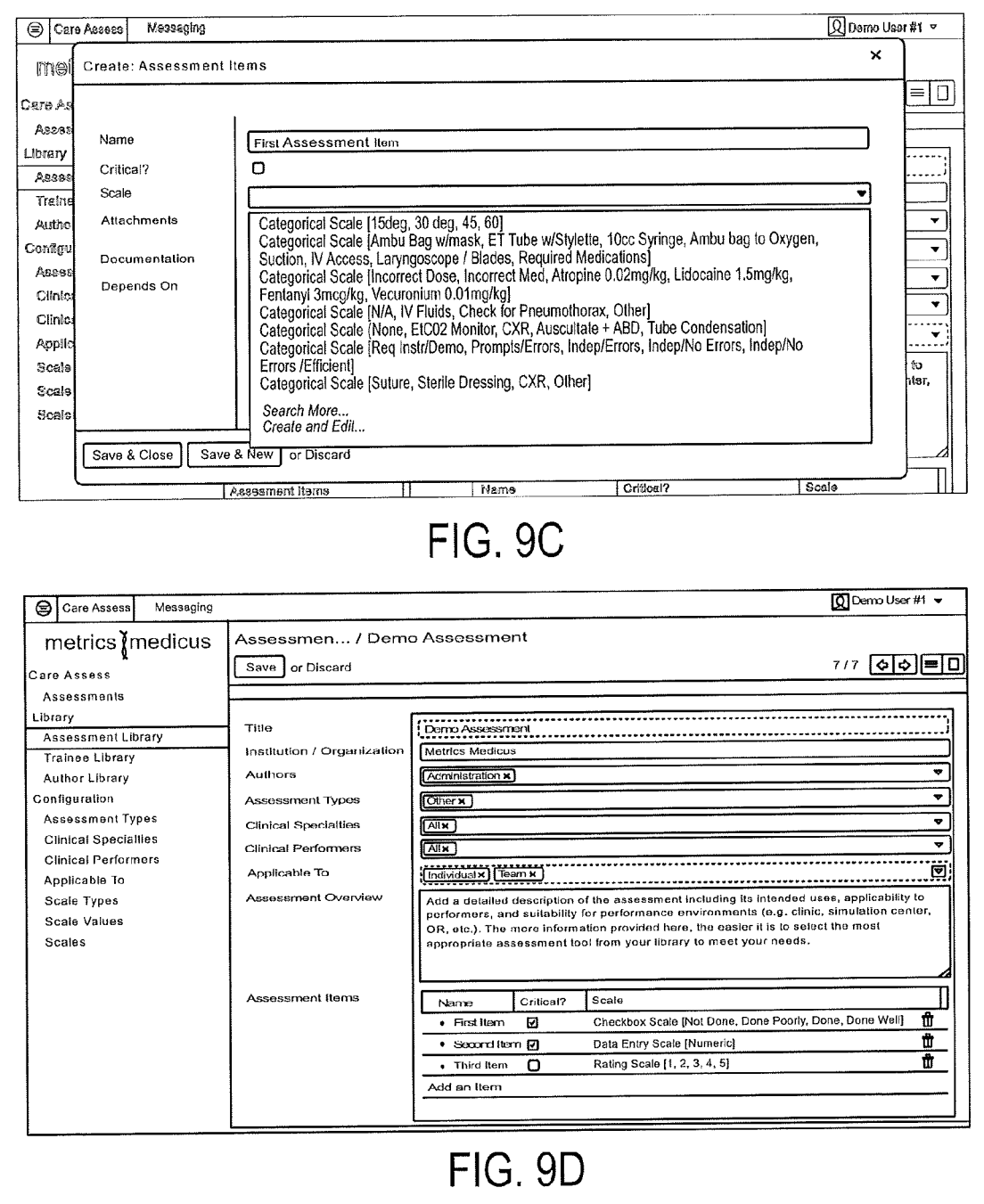

Categorical scale types will have scale values that describe the various categories of the performance construct. For example, a categorical scale designed to measure the performance ability to secure required clinical supplies might have scale values associated with each required clinical supply. Checkbox scale types may have scale values that describe the performance classification and are more broadly applied to multiple performance constructs. For example, a checkbox scale designed to measure whether the performance was completed correctly might have scale values that include Not Done, Done Incorrectly, and Done Correctly. Milestone scale types may have scale values that include the various levels across a continuum of performance achievement, such as Level 1, Level 2, etc. or another grouping denotation such as PGY1, PGY2, etc. Rating scale types may have scale values that span the range of measurement options for the performance, such that a scale with a range of measurement from 1 to 7 will have scale values that include 1, 2, 3, 4, 5, 6, and 7. Because data entry scales rely on data inputs at the time of an assessment, in one embodiment, the scale value requirements only specify if the data will be text or numeric and the conditions for scoring. A scale values configuration directory may be stored in the database 115 and scale values may be created in the process of creating or editing an assessment instrument in connection with the assessment builder 113. Alternatively, scale values may also be created within the Scale Values configuration directory itself using the utility 119. Scale Values are illustrated in connection with FIGS. 12B-12D. As illustrated in FIG. 9C, information from the scale values configuration directory may be available to a user when creating an assessment item.

In one embodiment, the Scale Types configuration directory may be pre-populated with five options that are commonly used in performance assessment: Categorical; Checkbox; Data Entry; Milestone; and Rating. Categorical scale types refer to scales where discrete categories describing performance with specific details are provided as measurement options and the assessment builder may allow the user to select multiple categories (e.g. Suture; Sterile Dressing; CXR; Other). Checkbox scale types refer to scales where discrete options describing performance within classification parameters are provided as measurement options (e.g. Not Done; Done Poorly; Done; Done Well). Data Entry scale types refer to scales where contextually specific text or numeric data are entered or otherwise captured as measurement (e.g. 10 min; 3 attempts; Stricture Complication; 28 weeks). Milestone scale types refer to scales tied to specific programmatic performance expectations, where the milestones are reflected in the item stem and the level of programmatically tied performance is captured as measurement (e.g. Level 1; Level 5). Milestone scales typically support summative assessment of mastery-learning initiatives or stepwise sequential performance objectives. Rating scale types refer to scales where performance is rated on a hierarchical continuum from low to high, with variable range and delineated precision (e.g. 1-10; Likert; Quartiles; Rankings). The Scale Types configuration directory may contain pre-populated scale types as well as those the user has created or imported. Scale Types may also be exported and/or deleted. Scale Types are illustrated in connection with FIG. 12A.

The user may also have the option to add an attachment to the assessment item, such as an image or media file that the assessor may use for reference purposes. For example, the assessor might access the media file as a comparison for what level of performance is expected (e.g. suture spacing; type of stitch; catheter choice, etc.). Attachments added through the assessment builder 113 may also be made available within the application 107.

The user may include a requirement for documentation to be added at the time of the assessment, to either support the assessment scoring or supplement the scoring with demonstrated performance evidence. To add a requirement for documentation, the user may select the option from the "DOCUMENTATION" pull down menu. The "DOCUMENTATION" menu includes three options: None, Optional, and Required. The None option specifies that no documentation is required for the assessment item. The Optional option specifies that providing documentation of performance is optional, but desirable. The Required option specifies that documentation of performance is required for the assessment item. In one embodiment, the documentation may be any media file that can be captured using the second computing device 105 running the application 107 (e.g., images, videos, audios, etc.).

For the assessment item, the user may also enter information related to item dependencies. There may be items in an assessment instrument that are contingent upon other assessment items being completed or where case specific conditions are not contextually relevant for the item. For example, an assessment instrument designed to measure performance of a laceration closure may include consideration of blood vessels and muscles, but only if the wound (context) requires that consideration. A "DEPENDS ON" menu item may allow the user to establish these types of contingencies within the assessment instrument. The user may select the other items within the assessment upon which the contingencies will be evaluated, and the data from those assessment items may determine whether or not the assessment item is viewable during assessment in the assessment module.

As illustrated in FIG. 9D, users may save assessment items and complete compiling assessment items to form an assessment instrument by way of the assessment builder 113.

Assessment instruments in the Assessment Library may be individually selected to be either deleted (which removes the assessment instrument from the Assessment Library), or exported (which exports the field contents of the assessment instrument in a comma-separated values (CSV) or Excel file format).

In one embodiment, the web browser 103 and related utility 119 may facilitate multiple payment options for buying institutional license or adding user licenses. For example, the web browser 103 and utility 119 may facilitate credit card usage, purchase orders, invoices, and web application store options. Additionally, institutional licenses can be bought, user licenses can be added, portfolio licenses can be retained and maintained individually. Assessments can be sent from an institutional license to a personal license individually or as a bundle. The assessments can then be downloaded to a personal library/account.

Figure 10:
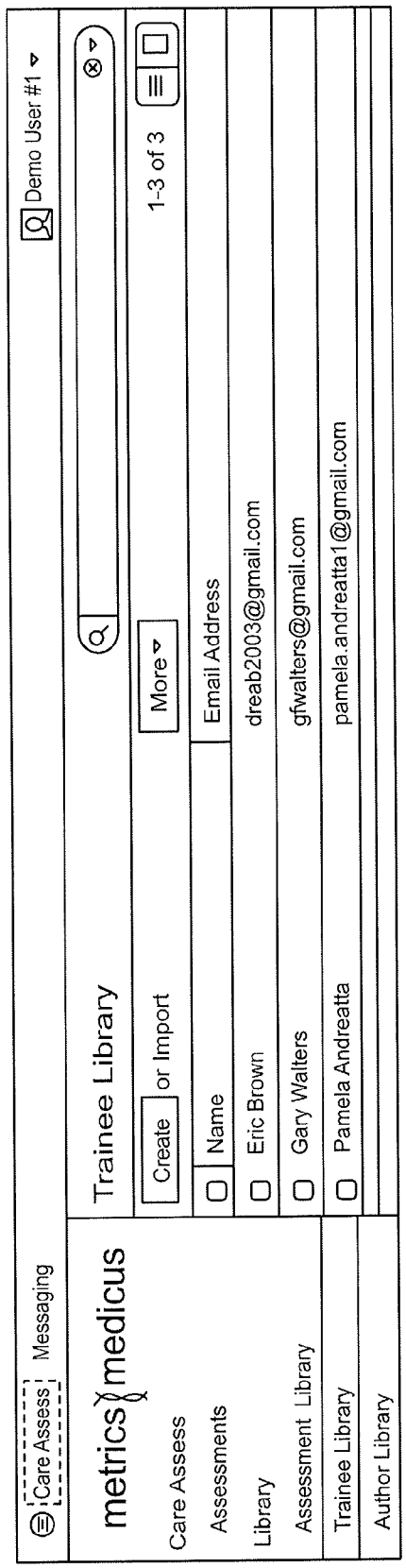
FIG. 10 illustrates a trainee portion of a graphical user interface of a web browser used in connection with the system that provides an electronic task assessment platform, according to an aspect of the present disclosure.

In one embodiment, the user may be an administrator that uses the web browser 103 of the first computing device 101 and, more particularly, the utility 119 may be used to view the trainee library illustrated in FIG. 10. The trainee library may contain the records of all trainees that the user has added to their library. Each record may include information such as the trainee name, trainee email address, position, title, image, affiliations, and access privileges. In one embodiment, the trainee record may also include attachments such as an institutional ID, head shot, and professional credentials. To add to the trainee library, the user may create a new trainee record, import one from an exported file, or import one through a purchased license agreement. In one embodiment, individuals or attributes in the trainee library may be searched, selected, viewed or imported.

In one embodiment, the utility 119 may include one or more templates for creating a trainee record. The template may include editable text fields and a pull down menu that facilitate easy development of a trainee record. In one embodiment, trainees may be grouped into various USERS, such as a "resident" or "nurse manager", so that users may be able to identify larger numbers of trainees more easily.

In one embodiment, the utility 119 may transmit a notification to the server 109 containing trainee information. The trainee information or trainee record may be stored in the database 115. The server 109 may transmit notification to the trainee using the second computing device 105 when the trainee is added to the trainee library and the trainee must accept the request before the addition to the trainee library is complete.

Figure 11:
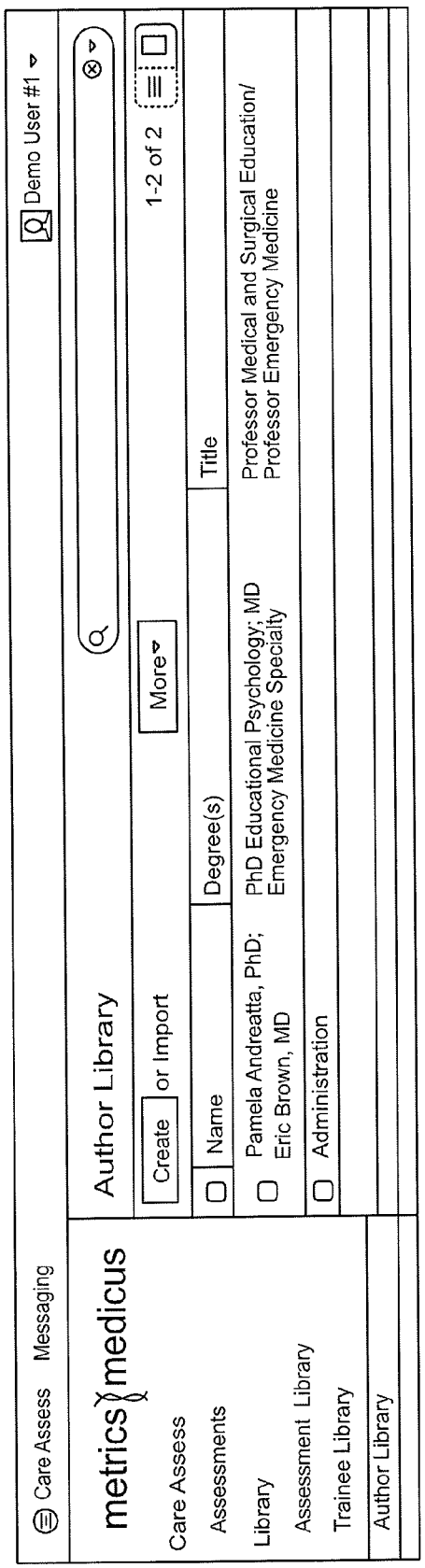
FIG. 11 illustrates an author portion of a graphical user interface of a web browser used in connection with the system that provides an electronic task assessment platform, according to an aspect of the present disclosure.

As illustrated in FIG. 11, in one embodiment, a user may be an administrator that uses the web browser 103 of the first computing device 101 and, more particularly, the utility 119 may be used to view the author library. The author library may contain all authors associated with assessment instruments that the user has either created or purchased a license to use. An author record may include author information such as the author's name, degree(s) and title. Author records may be searched, selected, viewed, edited, created and imported.

FIGS. 12A-12D illustrate examples of a graphical user interface displaying scale information including example scale type (FIG. 12A) and example scale values (FIGS. 12B-D), as described above.

FIG. 13 illustrates an export/import function of the utility 119. In one embodiment, data from any record stored in the database 115 may be exported as a comma separated variable (CSV) or EXCEL formatted file. This may include any data from completed assessments, libraries, or configuration directories. The user may be allowed to select portions of the completed assessment, library or configuration directory to export as well as a format of the export file. Accordingly, the data may be used for statistical analysis with third party tools.

Figure 14:
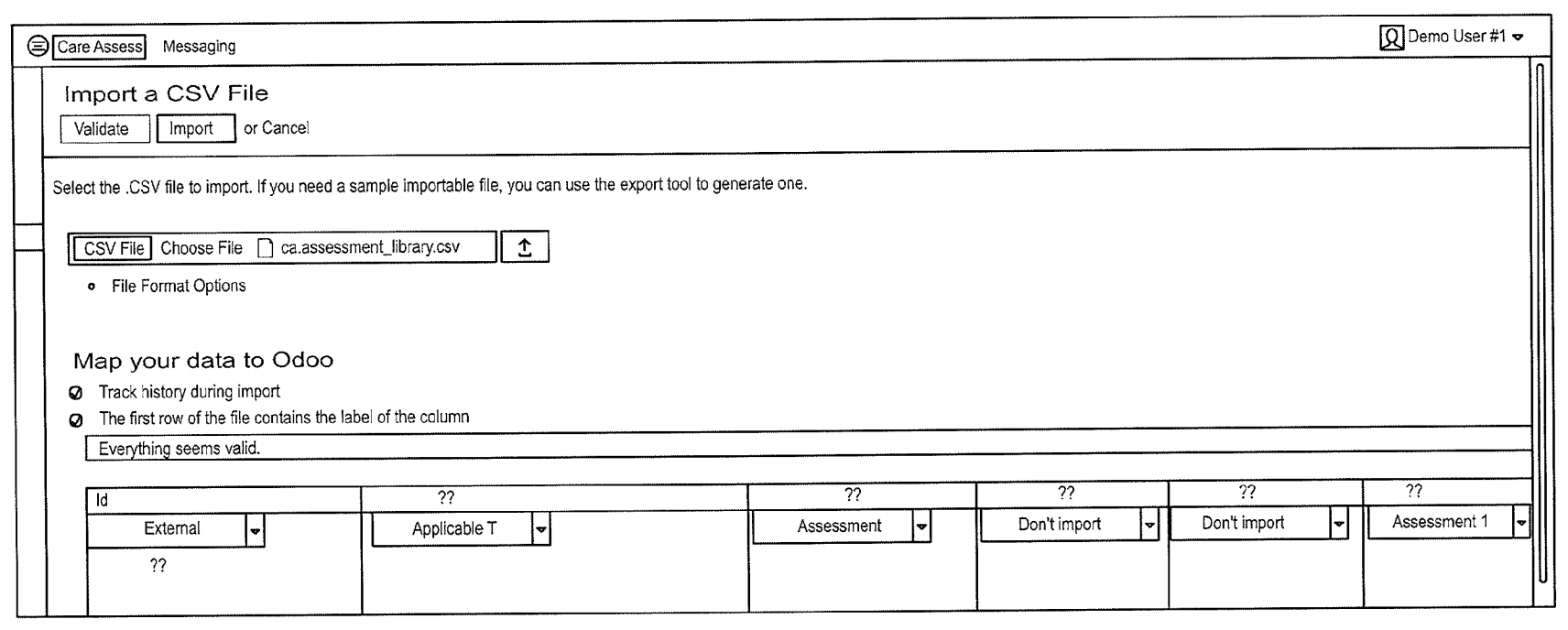

As illustrated in FIG. 14, the utility 119 may also allow a user to import data form a file. The imported data may be transmitted to the server 109 and stored in the database 115. In one embodiment, the utility 119 may include software capable of converting an uploaded file to a file or record capable of being stored on the database 115.

Figure 15:
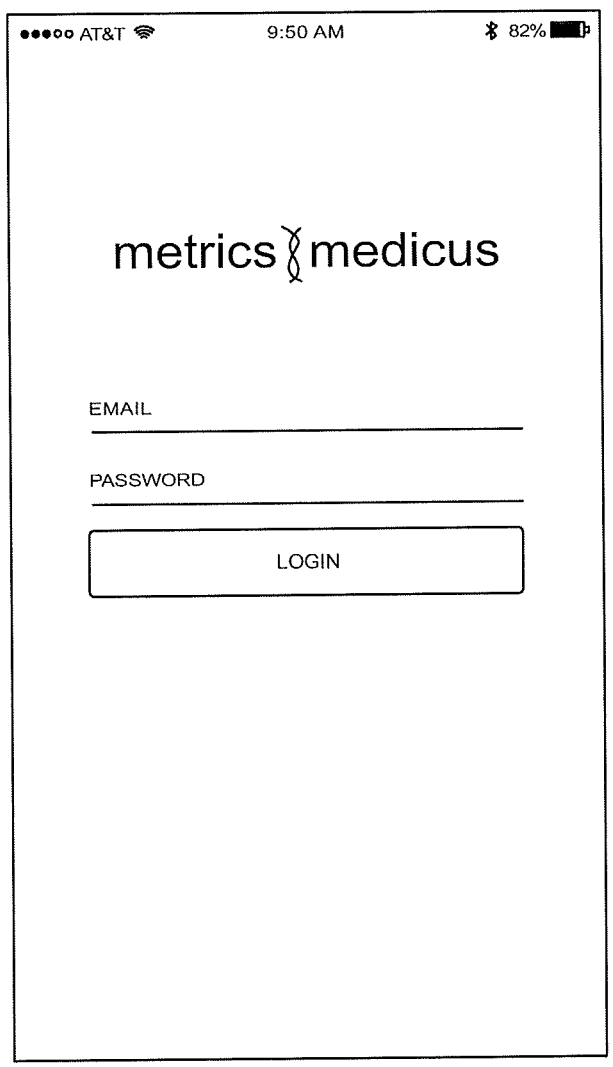
FIG. 15 illustrates a login for a graphical user interface in accordance with an application used in connection with the system that provides an electronic task assessment platform, according to an aspect of the present disclosure.

We turn now to FIGS. 15-34, which illustrate example aspects of the application 107 provided to a trainee or assessor using the second computing device 105. As illustrated in FIG. 15, a login screen may appear when the application 107 is first loaded. Users may be requested to enter their email address and password to login. These may have been established using the web browser 103 and related utility 119. Users may include trainees and/or assessors.

Figure 16:
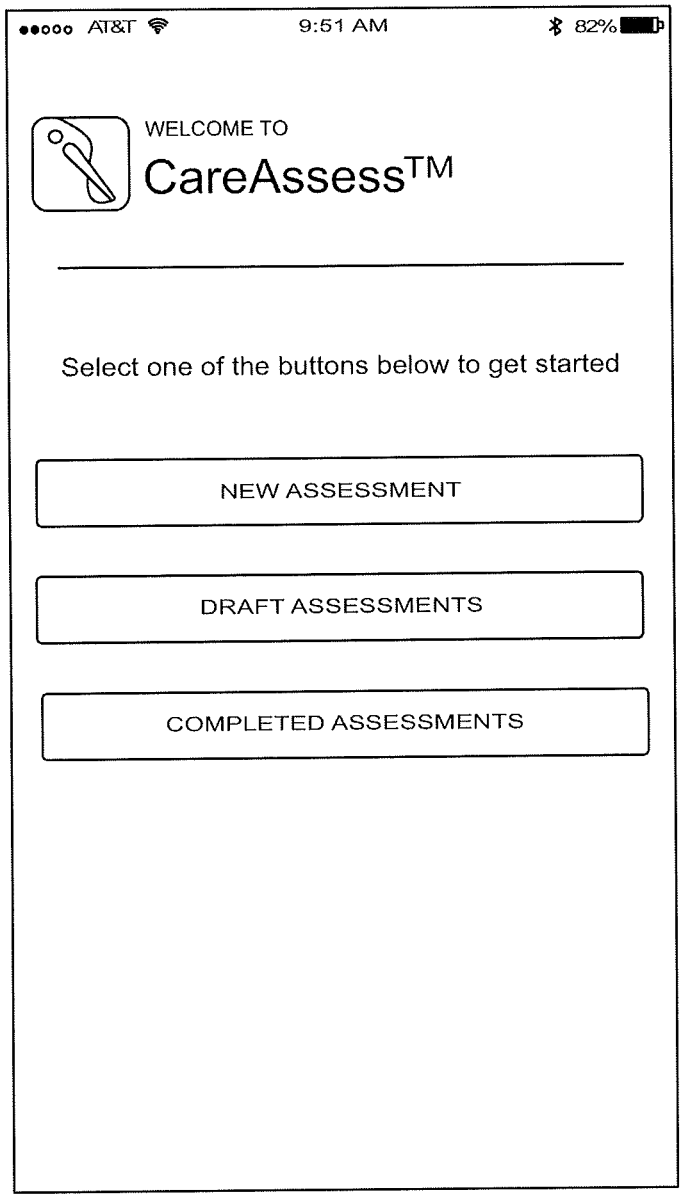
FIG. 16 illustrates a main menu for a graphical user interface in accordance with an application used in connection with the system that provides an electronic task assessment platform, according to an aspect of the present disclosure.

Once a user is logged in (their provided information corresponds with that stored in the database 115), the user may be presented with the welcome screen depicted in FIG. 16. The welcome screen may allow a user to select a new assessment, a draft assessment and/or a completed assessment.

Figure 17:
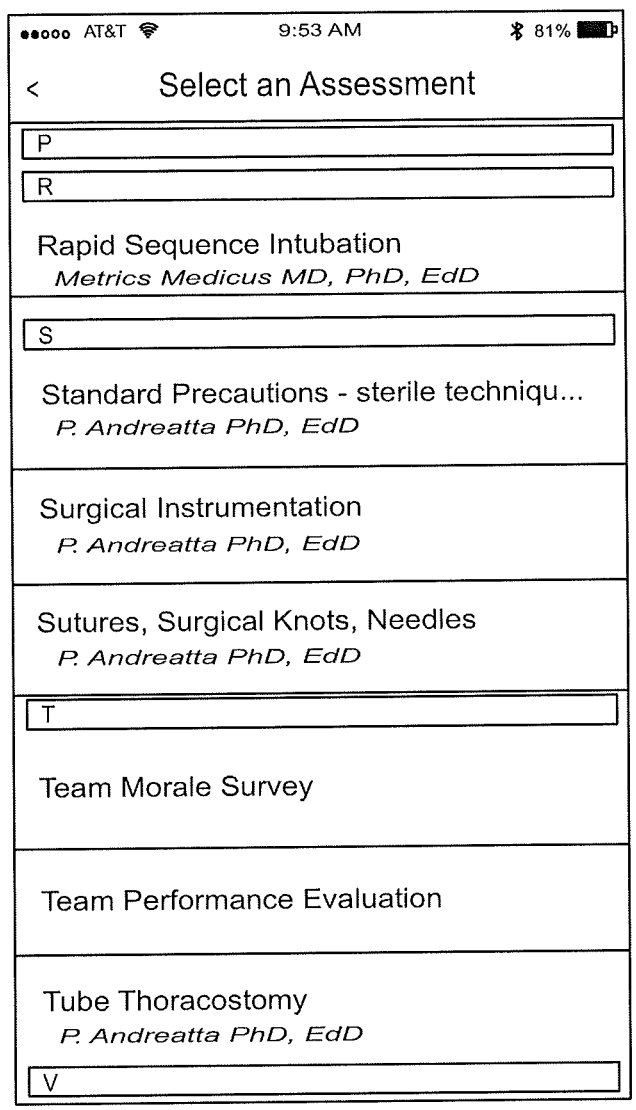
FIG. 17 illustrates an assessment menu for a graphical user interface in accordance with an application used in connection with the system that provides an electronic task assessment platform, according to an aspect of the present disclosure.
Figure 18:
FIG. 18 illustrates an assessment overview for a graphical user interface in accordance with an application used in connection with the system that provides an electronic task assessment platform, according to an aspect of the present disclosure.

As illustrated in FIG. 17, when the user selects a new assessment, the user may be provided with a library of assessment instruments that the user established through the web portal. Selected assessments can be displayed in the assessment overview window, depicted in FIG. 18, which displays information such as the Title, Institution/Organization, Authors, Assessment Type, Clinical Specialties, Clinical Performers, Applicable To, and Overview fields information that was included when creating or editing the Assessment Instrument.

Figure 19:
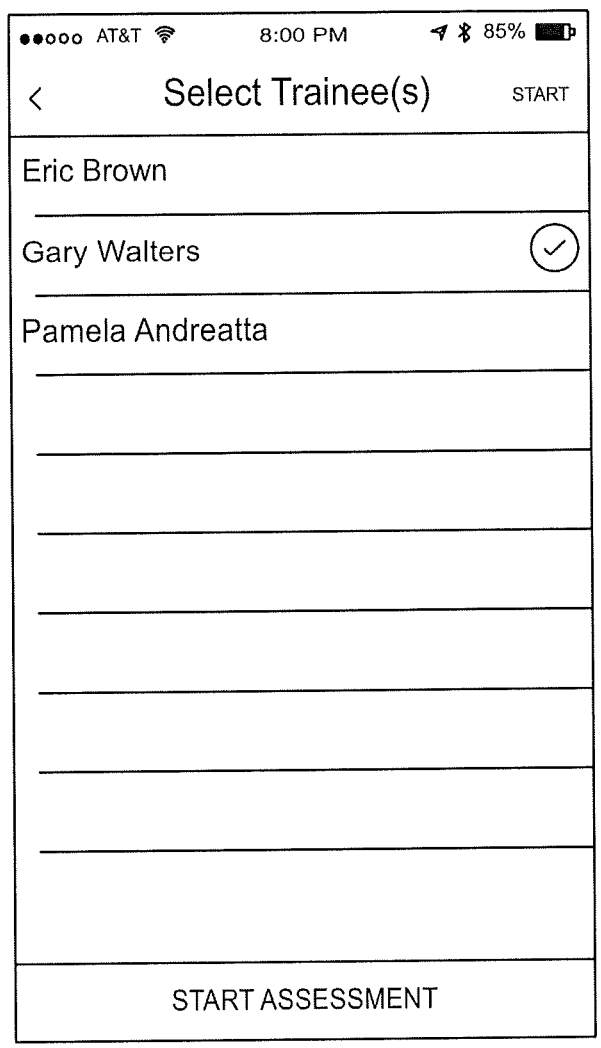
FIG. 19 illustrates a trainee portion for a graphical user interface in accordance with an application used in connection with the system that provides an electronic task assessment platform, according to an aspect of the present disclosure.

In a next step, the user may add trainees, as depicted in FIG. 19. Users may be prompted to add the trainees that will be assessed during the administration of the assessment. After the assessment instrument is selected, the application 107 may prompt the user to add trainees by loading the "SELECT TRAINEE(S)" menu item. The "SELECT TRAINEE(S)" menu may display a list of the trainees that the user established through the web portal (e.g., web browser 103 via first computing device 101). The user may select from the list of trainees they want to assess. Selected trainees may be indicated, for example, by a check mark next to their name.

After the trainees are selected, the application may prompt the user to begin the assessment, by selecting the "START ASSESSMENT" menu item. The "START ASSESSMENT" menu may display the contents of the assessment instrument that the user established through the web portal, including the title and all assessment items. The assessment may also display the name of the Assessor, Trainee(s), and Date the assessment is being performed.

Figure 20:
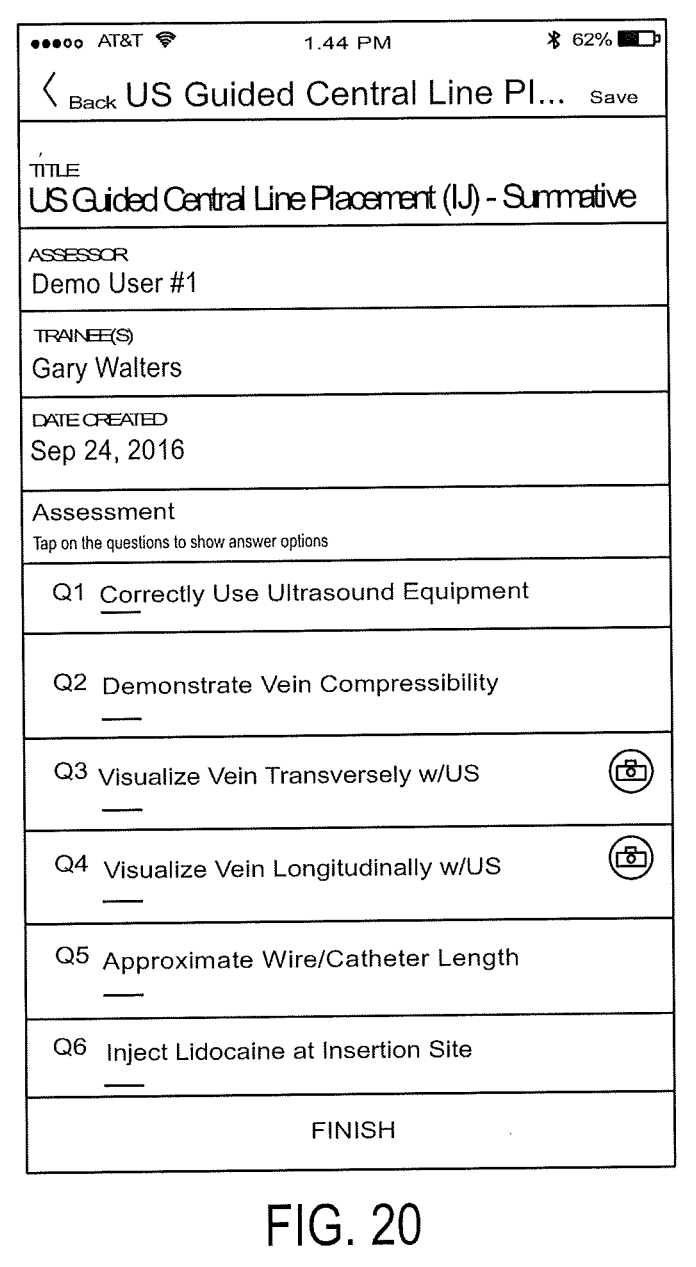

The user may complete the assessment by selecting each assessment item and either entering data or choosing the representative response describing the trainee(s)'s performance. When an assessment item has an attachment for reference, it may be displayed when the item is opened. When an attachment is indicated as being required for the response to the assessment item, an icon (or other suitable indication) may be displayed in the item menu (e.g., an image icon for a photo requirement), as illustrated in FIG. 20. In some examples, the user may navigate between the assessment items in any order, but all items may need to be completed before the assessment is considered to be finished. In some examples, the user may save an assessment to a drafts archive, before completing it using the "SAVE" menu item. The user may also return to the previous screen by selecting the "BACK" menu item.

Figure 21:
FIG. 21 illustrates a scale portion for a graphical user interface in accordance with an application used in connection with the system that provides an electronic task assessment platform, according to an aspect of the present disclosure.

The assessment items may be displayed as they are created (at the time the assessment instrument is loaded into the user's library). In some examples, an assessment item may include associated response categories that may require the user to select a pre-determine option (milestone, rating, checkbox, and categorical scales). The options may be displayed as a list, and the user may select one or more option(s) depending on the type of responses allowed. As illustrated in FIG. 21, the scale values (corresponding to the assessment item and selected while constructing the assessment using the assessment builder 113) may be displayed to the user for selection. For example, in FIG. 21 the user is prompted to enter a grade of "Not Done", "Done Poorly", "Done", and "Done Well" for the "Approximate Wire/Catheter Length" assessment item.

Figure 22:
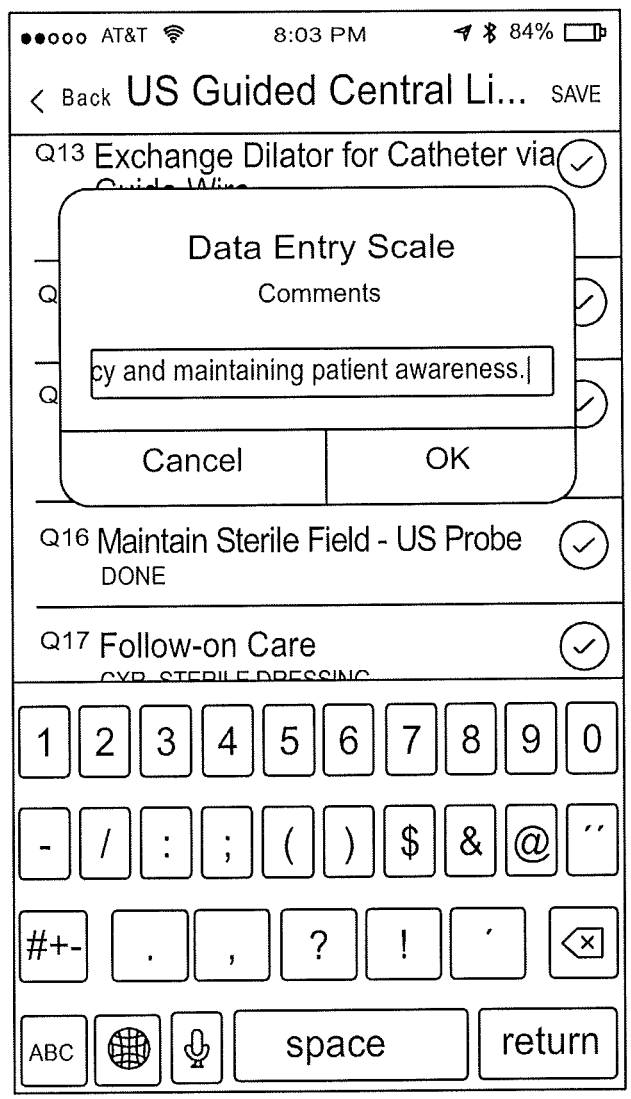
FIG. 22 illustrates a second scale portion for a graphical user interface in accordance with an application used in connection with the system that provides an electronic task assessment platform, according to an aspect of the present disclosure.
Figure 23:
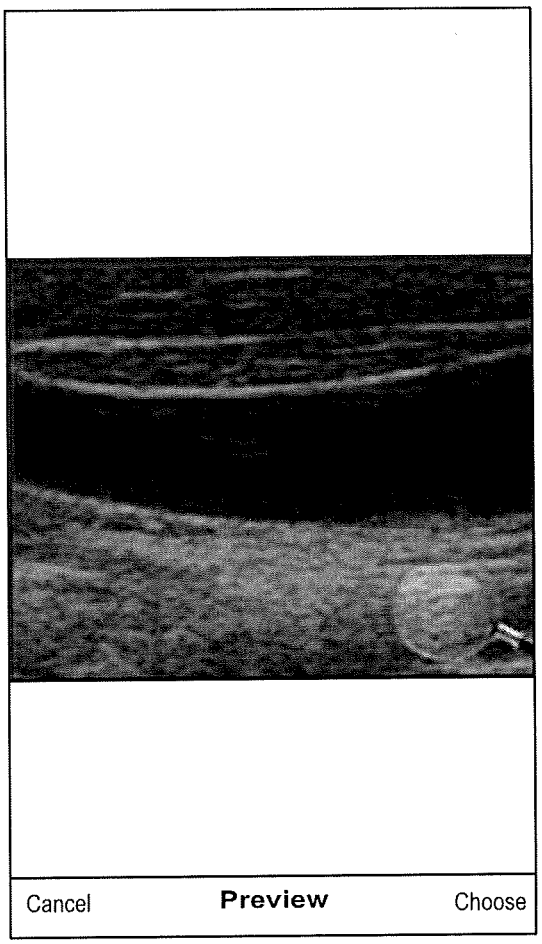
FIG. 23 illustrates a multimedia capture for a graphical user interface in accordance with an application used in connection with the system that provides an electronic task assessment platform, according to an aspect of the present disclosure.

If the assessment item includes a required data entry field, such as text or numeric responses, the data field will display for the user to type the response into the field, as illustrated in FIG. 22. The user may select "OK" to record the data, or "CANCEL" to cancel the item. If a media attachment is needed, the user may be prompted to capture the media (such as an image), and the media capture option for the computing device 105 may open to record the information. As is illustrated in FIG. 23, after the media is captured, in one embodiment, the user may view a preview of the captured media and may be asked to either choose the attachment for recording or to cancel the recording.

As illustrated in FIG. 24, in one embodiment, the application may include comments and notes fields that are available to the user to add additional information for the trainee and/or his or her supervisor(s). The "COMMENTS" field is a text entry field that allows the assessor to provide specific feedback to the trainee. The "NOTES" field is a text entry field that allows the assessor to provide specific information to the trainees' supervisors. Notes may also be sent to the trainee if they are added as a recipient when establishing the assessment preferences.

Figure 25:
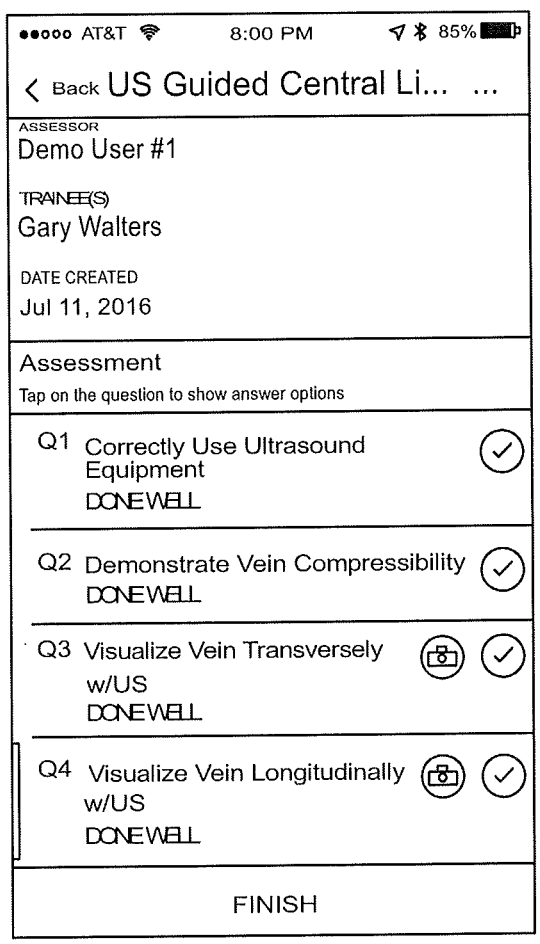
FIG. 25 illustrates another assessment portion for a graphical user interface in accordance with an application used in connection with the system that provides an electronic task assessment platform, according to an aspect of the present disclosure.

As illustrated in FIG. 25, items that have recorded responses may display an indication, such as a check mark. If a media attachment has been recorded, the media icon may be displayed, for example, with the check mark. After all assessment items have been completed, the user may be able to complete the assessment by selecting the "FINISH" menu item. The "FINISH" menu item may record the assessment data to the trainee(s) records. The application may request confirmation that the assessment record should be sent to the designated trainee(s), and the user may select "YES" to proceed or "NO" to revise the assessment.

Figure 26:
FIG. 26 illustrates a confirmation portion for a graphical user interface in accordance with an application used in connection with the system that provides an electronic task assessment platform, according to an aspect of the present disclosure.
Figure 27:
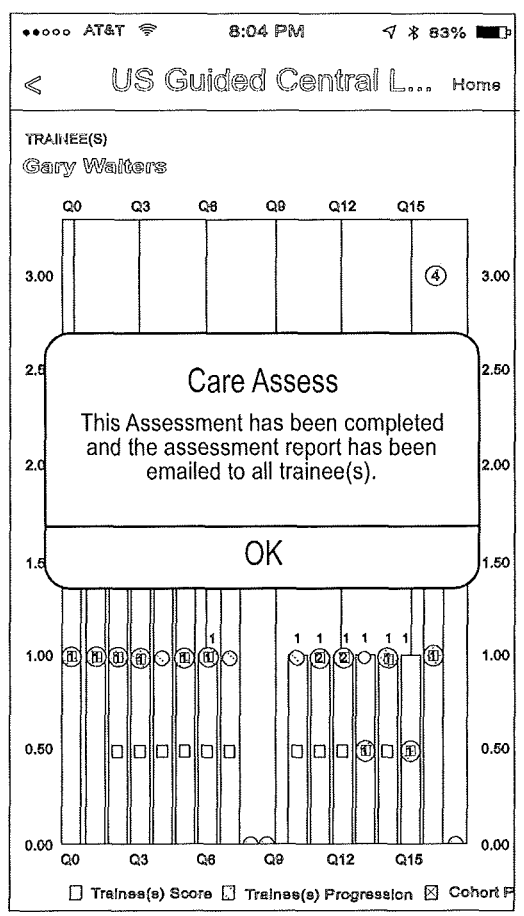
FIG. 27 illustrates a notification portion for a graphical user interface in accordance with an application used in connection with the system that provides an electronic task assessment platform, according to an aspect of the present disclosure.

As illustrated in FIG. 26, a confirmation message will display after the assessment data is recorded and sent to the trainee(s) and other designated recipients (e.g., a supervisor). The user may select "OK" to close the alert message, as illustrated in FIG. 27.

Figure 28:
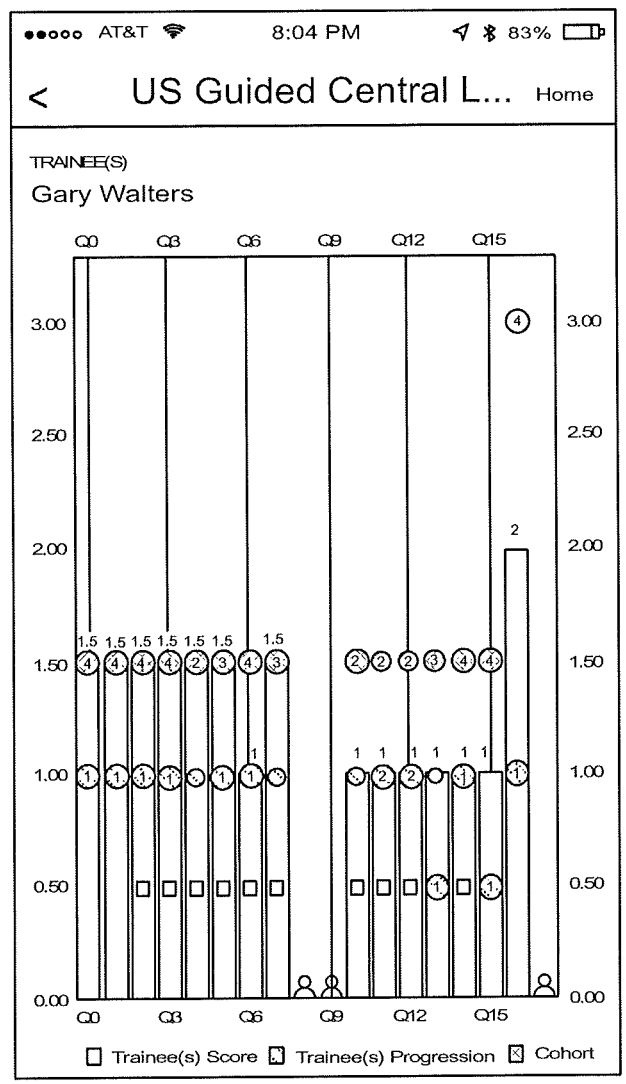
FIG. 28 illustrates a report displayed within the graphical user interface in accordance with an application used in connection with the system that provides an electronic task assessment platform, according to an aspect of the present disclosure.
Figure 29:
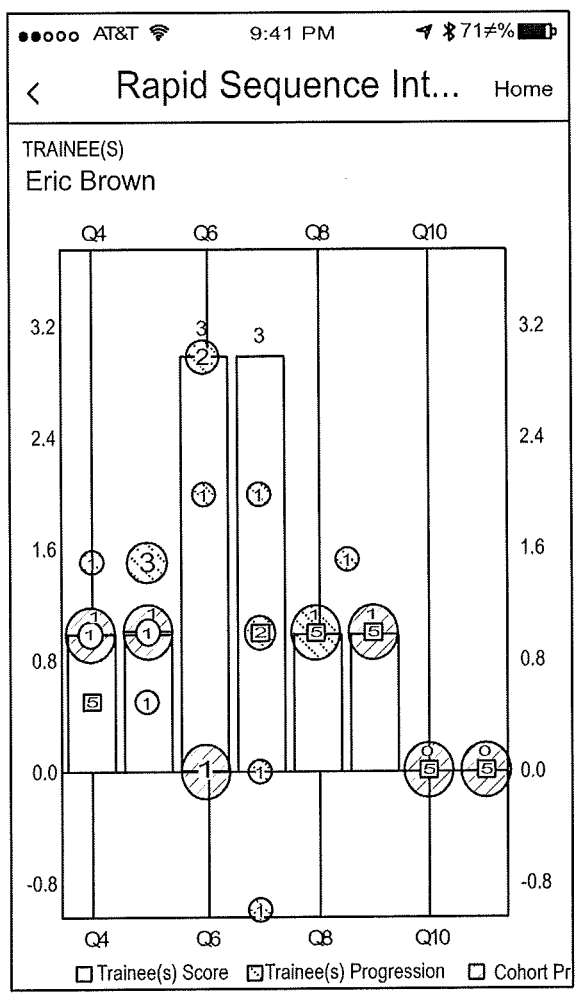
FIG. 29 illustrates a report displayed within the graphical user interface in accordance with an application used in connection with the system that provides an electronic task assessment platform, according to an aspect of the present disclosure.
Figure 30:
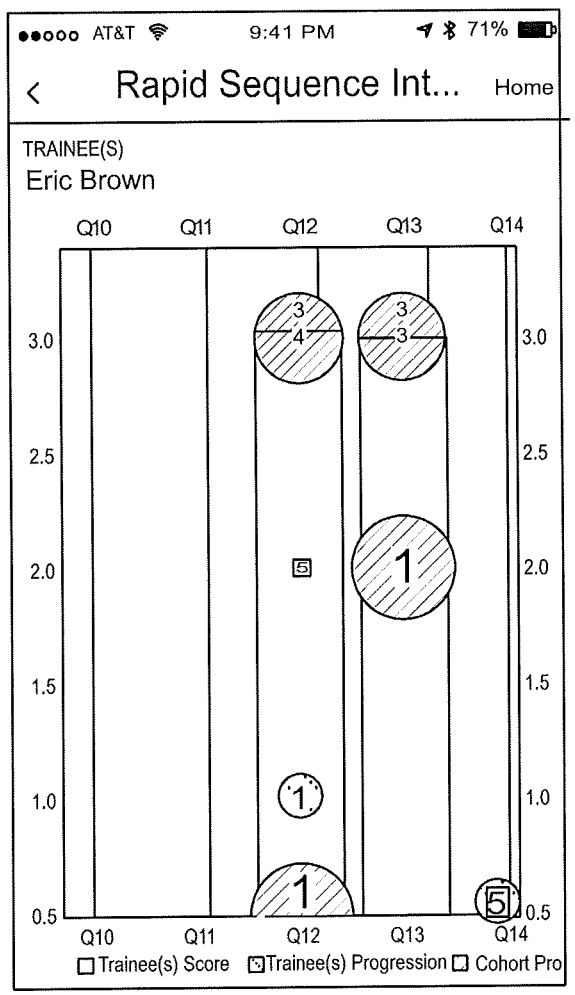
FIG. 30 illustrates a report displayed within the graphical user interface in accordance with an application used in connection with the system that provides an electronic task assessment platform, according to an aspect of the present disclosure.

FIGS. 28-30 illustrate an example of the report displayed on the report viewer 123 of the second computing device.

After closing the completed alert message, as illustrated in FIG. 28, the window may display the trainee(s)' longitudinal assessment records for the specific assessment instrument. The graphics displayed through the report viewer 123 may provide the user with additional information about how the trainee(s) are proceeding over time. The longitudinal assessment records may be a part of the reports provided by the statistical analysis module 127 of the server 109. The longitudinal assessment record may allow a user to view their abilities over time, as well as how their performance compares to all trainees who have been assessed using the assessment instrument.

As illustrated in the examples of FIGS. 28-30, the reports may display the score for each item of the assessment graphically for easy evaluation of progress over time. The scale for the items may be displayed on the right and left vertical axes. The item numbers may be displayed on the horizontal axes at the top and bottom of the graph. The legend for interpreting and comparing the score elements may be shown at the bottom of the window.

The score reports may present the score for the most recent assessment as a bar corresponding to the score, with the numeric score above the bar. In one embodiment, the report may use graphical indicators that are optimized so that a user with a limited screen size (e.g., a cell phone or a tablet) may interpret the data and information more easily and quickly. Graphical indicators may convey information due to variations in size, shape, color, and the like. The graphical indicators may be easier to interpret than numbers in the limited display area and limited screen size of mobile devices.

In one embodiment, scores and related information for an assessment item may be displayed as graphical indicators or markers. For example, the standard score for an assessment may be displayed as a first marker (solid lines), previous scores for a user may be displayed using a second marker (dashed lines) and the mean score of all trainees assessed using the instrument may be depicted using a third marker (dotted lines). Alternatively, the markers may have various colors and the like.

In one embodiment, the graphical indicators may be combined with numerical indicators. The number of data points comprising the previous assessment data may be displayed within the marker. For example, if the trainee scored at the known standard for the item on three occasions, the number 3 may be displayed in the first solid marker. If the trainee scored at lower level five times previously, the number 5 may appear in the second dashed marker. If there are 20 other trainees who have been assessed using the instrument, the number 20 may appear in the third dotted marker.

In one embodiment, the graphical indicators or markers may be combined or overlapped. If markers overlap with each other in one embodiment, both markers may be displayed. For example, if the mean of all trainee scores is the standard score for the item, a solid marker may be displayed within a dotted marker.

By combining graphical and numerical indicators, the reports displayed in the report viewer 123 are able to convey greater amounts of information to a user in the same amount of screen size, or viewing area.

In one embodiment, the size of the markers may reflect the number of scores that comprise the metric. For example, if the number of trainee scores for an item is ten, the marker will be substantially larger than if the number of trainee scores for the item is four.

In one embodiment, the report viewer 123 may be configured to allow users to zoom in or out to view the graphical representation of the trainee(s) scores. These features are designed to provide a quick visual evaluation of the trainees progress over time and relative to others in the cohort of trainees, and provides specific information about where the trainee is with regards to the acquisition or maintenance of specific performance abilities. This information may then be used to target development or remediation activities to improve performance.

Figure 31:
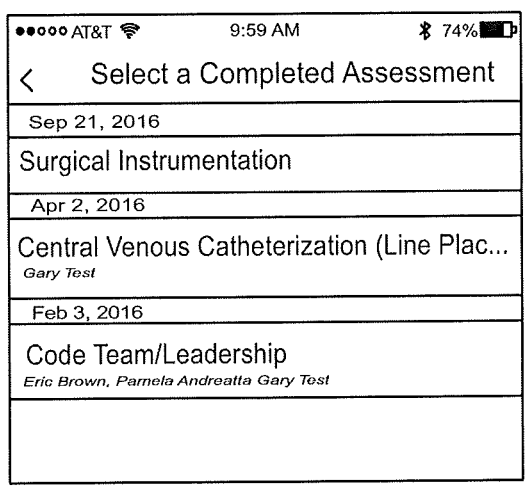
FIG. 31 illustrates a completed assessment portion of a graphical user interface in accordance with an application used in connection with the system that provides an electronic task assessment platform, according to an aspect of the present disclosure.
Figure 32:
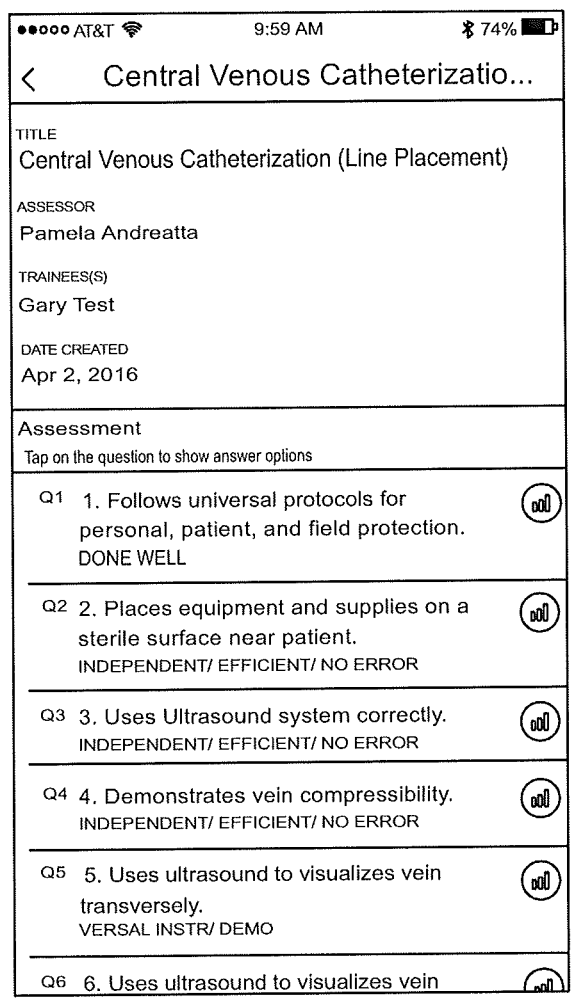
FIG. 32 illustrates a second completed assessment portion of a graphical user interface in accordance with an application used in connection with the system that provides an electronic task assessment platform, according to an aspect of the present disclosure.

Turning back to FIG. 16, if a user selects the option to view completed assessments, in one embodiment, the application 107 may update to display the screen depicted in FIG. 31. As illustrated in FIG. 31, the "COMPLETED ASSESSMENTS" screen may display a list of completed assessments sorted by date and title. The user may select the desired completed assessment from the list, which opens the selected completed assessment. The contents of the completed assessment may be displayed in the window, including the title, name of assessor, trainee name(s), date of completion, and each item. The score for each item may be presented within the item field. The score and score distribution data for each item may be available by selecting the item, which then opens the graphical representation in the window as illustrated in FIG. 32.

Figure 33:
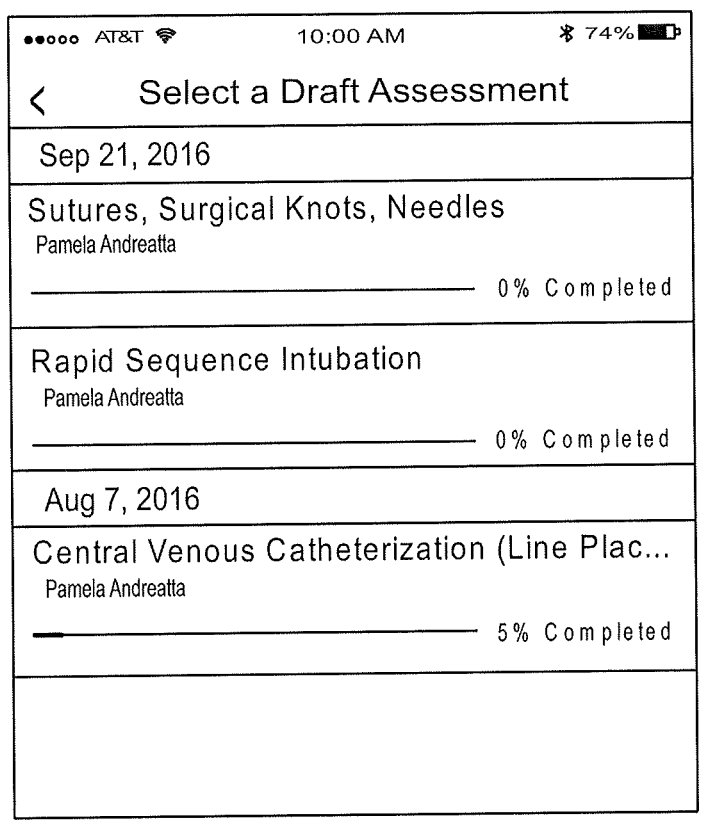
FIG. 33 illustrates a draft assessment portion of a graphical user interface in accordance with an application used in connection with the system that provides an electronic task assessment platform, according to an aspect of the present disclosure.
Figure 34:
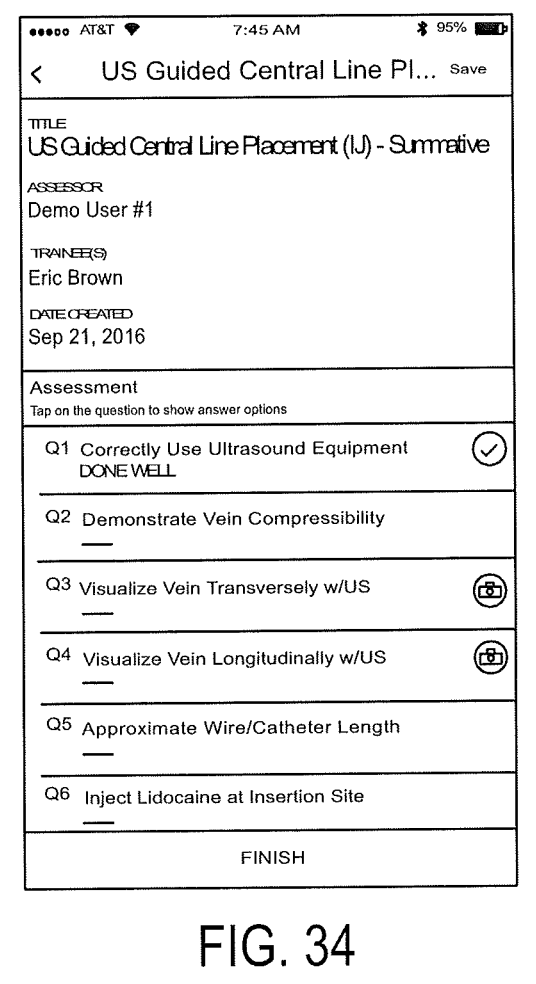

Turning back to FIG. 16, if a user selects the option to view draft assessments, in one embodiment, the application 107 may update to display the screen depicted in FIG. 33. The user selects "DRAFT ASSESSMENTS" from the menu, which opens a window displaying a list of draft assessments sorted by date and title, as illustrated in FIG. 33. The name of the assessor and the percentage of the assessment that is complete may be shown in the list of draft assessments. The user selects the desired draft assessment from the list, which opens the selected draft assessment as illustrated in FIG. 34. The contents of the draft assessment may be displayed in the window, including the title, name of assessor, trainee name (s), date created, and each item. The score for each item may be presented within the item field, along with a check mark to indicate that the item was scored. All unscored items may display in the same way as an assessment that is initiated from the start. Draft assessments may be completed and recorded as described herein.

Although the webpages and application screens (or portions thereof) illustrated in FIGS. 4-34 may include buttons, click boxes, text boxes, drop down menus and the like, any suitable alternatives such as sliders, radio buttons, tabs, etc. may be used in connection with the depicted webpages and application screens.

Although the description herein is described in relation to healthcare, it is envisioned that the described system can be utilized in any area that requires objective measurements of human performance. For example, the described system may be used for online learning, presentations, training, and the like. The described system may also be used in any environment where human performance assessment is desired, including high risk, task specific industries including (without limit) manufacturing, industrial settings, airline industry, nuclear industry and the military.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system for performance assessment of healthcare professionals comprising:
    a first device comprising a first user interface and including a web browser;
    a second device comprising a second user interface and including an assessment application; and
    at least one server communicatively coupled to each of the first device and the second device via a network, the at least one server comprising a non-transitory memory storing computer-readable instructions and at least one processor, execution of the instructions, by the at least one processor, causing the at least one server to:

provide, on the first device, via the web browser, an assessment builder comprising a plurality of customizable assessment components, wherein the customizable assessment components further comprise one or more assessment items defining one or more healthcare related performance evaluation tasks to be conducted by one or more healthcare professionals;

receive at least one constructed assessment from the first device, the at least one constructed assessment being constructed from among the plurality of customizable assessment components of the assessment builder via the first user interface, the at least one constructed assessment further comprising a selection of at least one assessment item from among the customizable assessment components;

present the at least one constructed assessment to the second device via the assessment application of the second device;

receive at least one completed assessment from the second device, the at least one completed assessment including one or more task performance evaluations associated with the presented at least one constructed assessment of the assessment application via the second user interface, wherein the one or more task performance evaluations include evaluations of the one or more healthcare professionals' execution of the healthcare related performance evaluation tasks;

generate statistical metrics for the received at least one completed assessment and the one or more task performance evaluations by applying statistics comparing the one or more task performance evaluations to at least one of previous task performance evaluations performed by the one or more health care professionals, one or more task performance evaluations performed by other healthcare professionals, and standard values;

generate a report including one or more graphical indicators indicative of the generated statistical metrics related to the one or more task performance evaluations based on the received at least one completed assessment; and display, via at least one of the first device and the second device, the generated report, wherein the generated report is specially optimized for display on a report viewer of at least one of the first device and the second device.

2. The system of claim 1, wherein the execution of the instructions further cause the at least one server to:

receive user information associated with one or more users from the first device;

store the received user information on a database communicatively coupled to the at least one server, to register the one or more users; and validate a user among the one or more users by comparing further user information received from the first device with the stored user information on the database, to permit access by the user to the database.

3. The system of claim 1, wherein the one or more statistical metrics are generated by a statistical analytics module of the at least one server, the statistical metrics comprising at least one of a performance metric of an individual user and a performance metric of an individual user in comparison to a group of users.

4. The system of claim 1, wherein the one or more statistical metrics involves a comparison between the one or more task performance evaluations and information stored on a database communicatively coupled to the at least one server.

5. The system of claim 4, wherein the information stored on the database comprises a past performance of a user of the second device on a corresponding assessment to the received at least one completed assessment.

6. The system of claim 4, wherein the information stored on the database comprises a benchmark value.

7. The system of claim 4, wherein the information stored on the database comprises performance information of a population of users that have completed one or more assessments corresponding to the received at least one completed assessment.

8. The system of claim 1, wherein the generated report displays the one or more statistical metrics using at least one of graphical and numerical indicators.

9. The system of claim 1, wherein the generated report displays at least one of a numerical score, a standard score, an indication of cohort progression, an indication of user progression, historical data, an indication of whether credit was awarded for a task, an indication of whether a task is critical, a name for the task, a task value, and documentation.

10. The system of claim 1, wherein the plurality of customizable assessment components further comprises at least one of a title, an affiliated organization, an author, an assessment type, one or more clinical specialties, one or more clinical performers, an applicability element, one or more assessment items, and an assessment overview.

11. The system of claim 10, wherein the one or more assessment items further comprises one or more of a name, a critical item designation and an item scale.

12. The system of claim 11, wherein the critical item designation further comprises a designation that an item is required for a user to correctly perform.

13. The system of claim 11, wherein the item scale further comprises at least one of a scale type and a scale value, wherein the scale type is at least one of categorical, a checkbox, a milestone, a rating, a data entry, and user generated information, and the scale value is at least one of a numerical value, text information, a binary value and user generated information.

14. A method for performance assessment of healthcare professionals comprising:

providing, via at least one server, to a first device comprising a first user interface and including a web browser, an assessment builder comprising a plurality of customizable assessment components, wherein the customizable assessment components further comprise one or more assessment items defining one or more healthcare related performance evaluation tasks to be conducted by one or more healthcare professionals, wherein the at least one server is communicatively coupled to each of the first device and a second device via a network and the at least one server further comprises a non-transitory memory storing computer-readable instructions and at least one processor;

receiving, by the at least one server, from the first device, at least one constructed assessment, the at least one constructed assessment being constructed from among the plurality of customizable assessment components of the assessment builder via the first user interface, the at least one constructed assessment further comprising a selection of at least one assessment item from among the customizable assessment components;

presenting, by the at least one server to the second device comprising a second user interface and including an assessment application, the at least one constructed assessment via the assessment application;

receiving, by the at least one server, at least one completed assessment from the second device, the at least one completed assessment including one or more task performance evaluations associated with the presented at least one constructed assessment of the assessment application via the second user interface, wherein the one or more task performance evaluations include evaluations of the one or more healthcare professionals' execution of the healthcare related performance evaluation tasks, generating, by the at least one server, statistical metrics for the received at least one completed assessment and the one or more task performance evaluations by applying statistics comparing the one or more task performance evaluations to at least one of previous task performance evaluations performed by the one or more health care professionals, one or more task performance evaluations performed by other healthcare professionals, and standard values;

generating, via the at least one server, a report including one or more graphical indicators inactive of the generated statistical metrics related to the one or more task performance evaluations based on the received at least one completed assessment; and displaying, via at least one of the first device and the second device, the generated report, wherein the generated report is specially optimized for display on a report viewer of at least one of the first device and the second device.

15. The method of claim 14, the method further comprising:

receiving, at the at least one server from the first device, user information associated with one or more users;

storing, the received user information on a database communicatively coupled to the at least one server, to register the one or more users; and validating a user among the one or more users by comparing further user information received from the first device with the stored user information on the database, to permit access by the user to the database.

16. The method of claim 14, wherein the one or more statistical metrics are generated by a statistical analytics module of the at least one server, the statistical metrics comprising at least one of a performance metric of an individual user and a performance metric of an individual user in comparison to a group of users.

17. The method of claim 14, wherein the one or more statistical metrics are generated by comparing the one or more task performance evaluations and information stored on a database communicatively coupled to the at least one server.

18. The method of claim 17, wherein the information stored on the database comprises a past performance of a user of the second device on a corresponding assessment to the received at least one completed assessment.

19. The method of claim 17, wherein the information stored on the database comprises a benchmark value.

20. The method of claim 17, wherein the information stored on the database comprises performance information of a population of users that have completed one or more assessments corresponding to the received at least one completed assessment.

21. The method of claim 14, wherein the displaying of the generated report displays the one or more statistical metrics using at least one of graphical and numerical indicators.

22. The method of claim 14, wherein the displaying of the generated report further comprises displaying at least one of a numerical score, a standard score, an indication of cohort progression, an indication of user progression, historical data, an indication of whether credit was awarded for a task, an indication of whether a task is critical, a name for the task, a task value, and documentation.

23. The method of claim 14, wherein the plurality of customizable assessment components further comprises at least one of a title, an affiliated organization, an author, an assessment type, one or more clinical specialties, one or more clinical performers, an applicability element, one or more assessment items, and an assessment overview.

24. The method of claim 14, wherein the one or more assessment items further comprises one or more of a name, a critical item designation and an item scale.

25. The method of claim 24, wherein the critical item designation further comprises a designation that an item is required for a user to correctly perform.

26. The method of claim 24, wherein the item scale further comprises at least one of a scale type and a scale value, wherein the scale type is at least one of categorical, a checkbox, a milestone, a rating, a data entry, and user generated information, and the scale value is at least one of a numerical value, text information, a binary value and user generated information.

* * * * *